(12) United States Patent
Tokuchi

(10) Patent No.: US 11,121,937 B2
(45) Date of Patent: Sep. 14, 2021

(54) INFORMATION PROCESSING APPARATUS AND NON-TRANSITORY COMPUTER READABLE MEDIUM STORING PROGRAM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 101 days.

(21) Appl. No.: 16/253,232

(22) Filed: Jan. 22, 2019

(65) Prior Publication Data
US 2020/0014606 A1 Jan. 9, 2020

(30) Foreign Application Priority Data
Jul. 9, 2018 (JP) .............................. JP2018-130290

(51) Int. Cl.
*H04L 12/24* (2006.01)

(52) U.S. Cl.
CPC ............ *H04L 41/50* (2013.01); *H04L 41/085* (2013.01)

(58) Field of Classification Search
CPC .................. H04L 41/50; H04L 41/085
See application file for complete search history.

(56) References Cited

U.S. PATENT DOCUMENTS

| | | | | |
|---|---|---|---|---|
| 2002/0021310 A1* | 2/2002 | Nakai | .................. | G06F 3/0486 715/837 |
| 2011/0090315 A1* | 4/2011 | Shibata | ................ | H04N 13/359 348/46 |
| 2013/0201522 A1* | 8/2013 | Ohashi | .................. | G06F 3/1296 358/1.15 |
| 2014/0036058 A1* | 2/2014 | Takahashi | ............ | G02B 21/367 348/80 |
| 2014/0075003 A1 | 3/2014 | Tanaka et al. | | |
| 2015/0022554 A1* | 1/2015 | Nobori | ................ | H04N 9/3155 345/634 |
| 2016/0187653 A1* | 6/2016 | Kimura | ................... | G06T 11/60 345/8 |
| 2017/0171037 A1 | 6/2017 | Tanaka et al. | | |
| 2017/0277380 A1* | 9/2017 | Shan | ..................... | G06F 3/0486 |

FOREIGN PATENT DOCUMENTS

| | | |
|---|---|---|
| JP | 2015177504 | 10/2015 |
| JP | 2015223006 | 12/2015 |
| WO | 2013061517 | 5/2013 |

* cited by examiner

*Primary Examiner* — Christopher B Robinson
(74) *Attorney, Agent, or Firm* — JCIPRNET

(57) ABSTRACT

An information processing apparatus includes a control section that makes display of an image of a configuration different between a case where the image of the configuration used for a cooperation function is displayed in a region for setting a cooperation function and a case where the image is not displayed in the region.

18 Claims, 17 Drawing Sheets

<INDEPENDENT FUNCTION MANAGEMENT TABLE>

| CONFIGURATION | FUNCTION | OUTPUT CONTENT |
|---|---|---|
| SENSOR A | TEMPERATURE SENSING FUNCTION, HUMIDITY SENSING FUNCTION, PRESSURE SENSING FUNCTION, ··· | TEMPERATURE DATA, HUMIDITY DATA, PRESSURE DATA, ··· |
| MULTI-FUNCTION PERIPHERAL B | SCANNING FUNCTION, PRINTING FUNCTION, COPYING FUNCTION | IMAGE DATA, PRINTED MATTER, ··· |
| ROBOT C | CONVEYANCE FUNCTION, IMAGING FUNCTION, CONVERSATION FUNCTION, RETRIEVAL FUNCTION, ··· | IMAGE DATA, VOICE DATA, ··· |
| PC (D) | COMMUNICATION FUNCTION, DISPLAY FUNCTION, STORAGE FUNCTION, ··· | ··· |
| APPLICATION 1 | STATISTICAL FUNCTION, ··· | STATISTICAL DATA, ··· |
| APPLICATION 2 | DOCUMENT CREATION FUNCTION, ··· | DOCUMENT DATA, ··· |
| APPLICATION 3 | IMAGE PROCESSING FUNCTION, ··· | IMAGE DATA, ··· |
| ··· | ··· | ··· |

FIG. 3

⟨INDEPENDENT FUNCTION MANAGEMENT TABLE⟩

| CONFIGURATION | FUNCTION | OUTPUT CONTENT |
|---|---|---|
| SENSOR A | TEMPERATURE SENSING FUNCTION, HUMIDITY SENSING FUNCTION, PRESSURE SENSING FUNCTION, ... | TEMPERATURE DATA, HUMIDITY DATA, PRESSURE DATA, ... |
| MULTI-FUNCTION PERIPHERAL B | SCANNING FUNCTION, PRINTING FUNCTION, COPYING FUNCTION | IMAGE DATA, PRINTED MATTER, ... |
| ROBOT C | CONVEYANCE FUNCTION, IMAGING FUNCTION, CONVERSATION FUNCTION, RETRIEVAL FUNCTION, ... | IMAGE DATA, VOICE DATA, ... |
| PC (D) | COMMUNICATION FUNCTION, DISPLAY FUNCTION, STORAGE FUNCTION, ... | ... |
| APPLICATION 1 | STATISTICAL FUNCTION, ... | STATISTICAL DATA, ... |
| APPLICATION 2 | DOCUMENT CREATION FUNCTION, ... | DOCUMENT DATA, ... |
| APPLICATION 3 | IMAGE PROCESSING FUNCTION, ... | IMAGE DATA, ... |
| ... | ... | ... |

FIG. 19

⟨SET CONTENT MANAGEMENT TABLE⟩

| ID | CONFIGURATION | SET CONTENT OF COOPERATION FUNCTION |
|---|---|---|
| 1 | • MULTI-FUNCTION PERIPHERAL B<br>• PRESENTATION APPLICATION P | SCANNING IS PERFORMED BY MULTI-FUNCTION PERIPHERAL B, AND SCANNING DATA IS ADDED TO PRESENTATION DATA BY PRESENTATION APPLICATION P. |
| 2 | • MULTI-FUNCTION PERIPHERAL B<br>• DESTINATION MANAGEMENT APPLICATION Q | FAX TRANSMISSION IS PERFORMED BY MULTI-FUNCTION PERIPHERAL B, AND DESTINATION OF FAX TRANSMISSION IS ADDED TO ADDRESS BOOK BY DESTINATION MANAGEMENT APPLICATION Q. |
| 3 | • MAIN BODY PORTION B1 OF MULTI-FUNCTION PERIPHERAL B<br>• PC (D) | SCANNING IS PERFORMED BY MULTI-FUNCTION PERIPHERAL B, AND SCANNING DATA IS PRESERVED IN PC (D). |
| 4 | • DOCUMENT CREATION APPLICATION G<br>• BUSINESS FORM CREATION APPLICATION N | DOCUMENT FILE IS ADDED TO BUSINESS FORM FILE. |
| 5 | • MULTI-FUNCTION PERIPHERAL B<br>• BUSINESS FORM CREATION APPLICATION N | SCANNING IS PERFORMED BY MULTI-FUNCTION PERIPHERAL B, AND SCANNING DATA IS ADDED TO BUSINESS FORM BY BUSINESS FORM CREATION APPLICATION N. |
| 6 | • DOOR OPENING/CLOSING SENSOR E<br>• LIGHTING APPARATUS F | IN CASE WHERE OPENING OF DOOR IS SENSED, LIGHTING APPARATUS IS LIGHTED. |
| ... | ... | ... |

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-130290 filed Jul. 9, 2018.

BACKGROUND (i) Technical Field

The present invention relates to an information processing apparatus and a non-transitory computer readable medium storing a program.

(ii) Related Art

JP2015-177504A discloses an apparatus which acquires information regarding cost required for a plurality of apparatuses to perform cooperative operations, and presents the information regarding cost to a user in correlation with apparatuses performing the cooperative operations.

JP2015-223006A discloses a system which restricts an amount to be used by a user when apparatuses are in cooperation.

WO2013/061517A discloses an apparatus which transmits an apparatus list including an unconnected apparatus which is an owned apparatus not retrieved this time and a connected apparatus which is an owned apparatus retrieved this time, to an external server, displays apparatus cooperation services indicated by apparatus cooperation service list information and an apparatus determined as being an owned apparatus in a list form on a display unit, and allows a user to select an apparatus cooperation service.

SUMMARY

Meanwhile, a cooperation function may be set.

Aspects of non-limiting embodiments of the present disclosure relate to an information processing apparatus and a non-transitory computer readable medium storing a program, capable of changing display of a configuration used for a cooperation function such that the cooperation function can be easily set.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a control section that makes display of an image of a configuration different between a case where the image of the configuration used for a cooperation function is displayed in a region for setting a cooperation function and a case where the image is not displayed in the region.

BRIEF DESCRIPTION OF THE DRAWINGS

Exemplary embodiment(s) of the present invention will be described in detail based on the following figures, wherein:

FIG. 3 is a diagram illustrating an independent function management table;
FIG. 19 is a diagram illustrating a set content management table.

DETAILED DESCRIPTION

Figure 1:
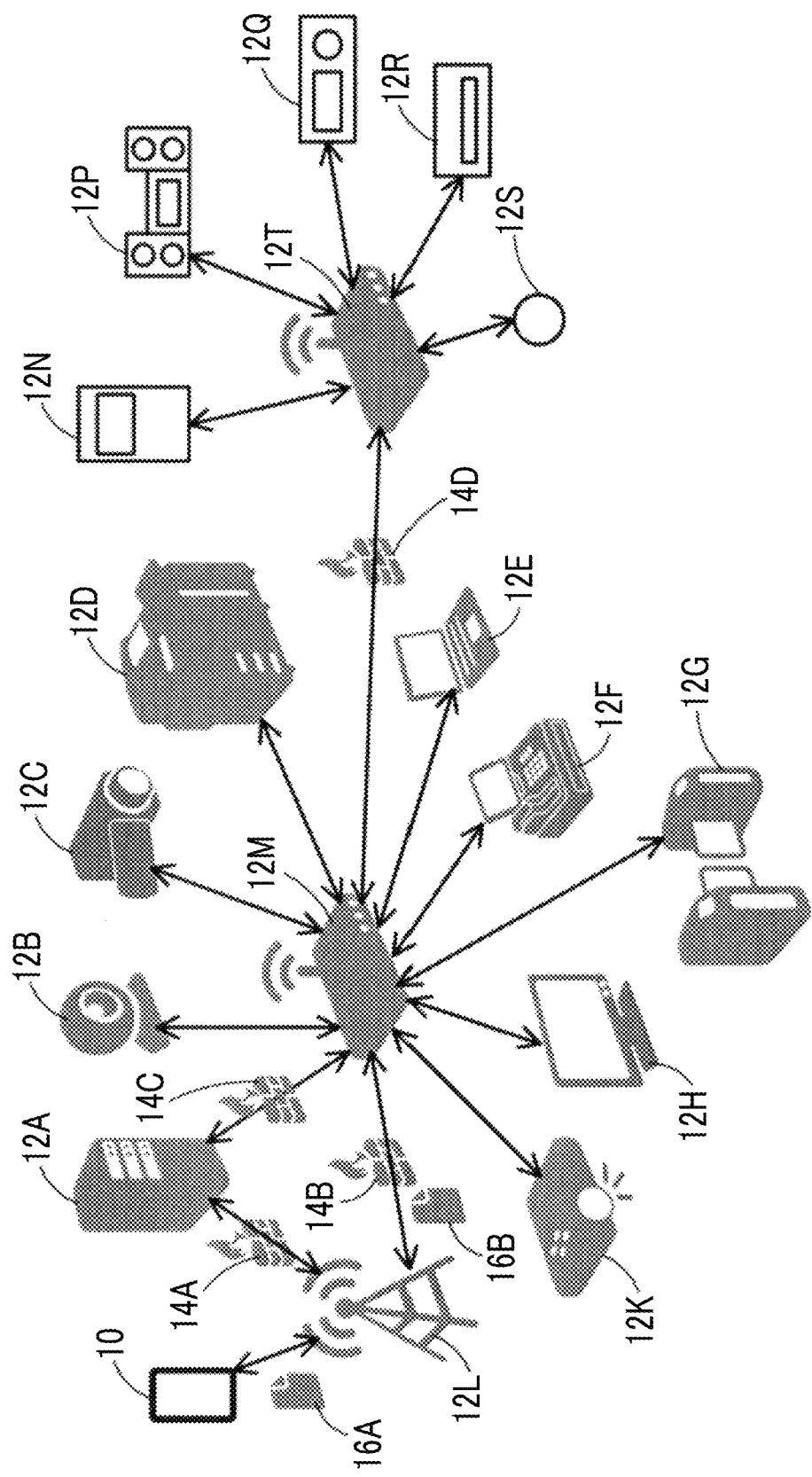
FIG. 1 is a block diagram illustrating a configuration of an information processing system according to an exemplary embodiment of the present invention.

With reference to FIG. 1, a description will be made of an information processing system according to an exemplary embodiment. FIG. 1 illustrates an example of an information processing system according to the present exemplary embodiment.

The information processing system according to the present exemplary embodiment includes one or a plurality of pieces of terminal equipment and one or a plurality of apparatuses. In the example illustrated in FIG. 1, the information processing system includes terminal equipment 10 and apparatuses 12A to 12T. This configuration is only an example, and the information processing system may include a plurality of pieces of terminal equipment 10, and may include other apparatuses. Hereinafter, in a case where the respective apparatuses are not required to be differentiated from each other, each apparatus will be referred to as an "apparatus 12". The terminal equipment 10 may be included in the conceptual category of the apparatus 12. In other words, the terminal equipment 10 may be handled as the apparatus 12.

The terminal equipment 10 and each apparatus 12 have a function of performing communication with other apparatuses. The communication may be wireless communication, and may be wired communication. For example, the terminal equipment 10 and each apparatus 12 may perform communication with other apparatuses via communication paths such as the Internet or other networks, may perform direct communication with other apparatuses, may perform communication with other apparatuses via repeaters functioning as hubs, and may perform communication with other apparatuses via a so-called cloud or a server. Each apparatus 12 may be a so-called Internet of Things (IoT) apparatus. A firewall for preventing illegal intrusion into a communication path may be provided in the communication path. In the example illustrated in FIG. 1, firewalls 14A to 14D are provided.

The terminal equipment 10 as an information processing apparatus is an apparatus such as a personal computer (PC), a tablet PC, a smart phone, or a mobile phone, and has a function of performing communication with other apparatuses. The terminal equipment 10 may be a wearable terminal (for example, a wristwatch type terminal, a wristband type terminal, a spectacle type terminal, a ring type terminal, a contact lens type terminal, an intracorporeal embedded type terminal, and a bearable terminal). The terminal equipment 10 may have a flexible display as a display device. As the flexible display, for example, an organic electroluminescence type display (flexible organic EL display), an electronic paper type display, or a flexible liquid crystal display is used. Flexible displays employing display methods other than those described may be used. The flexible display is a display of which a display portion is flexibly deformable, and is, for example, a display which can be bent, folded, rolled, twisted, or stretched. The entire terminal equipment 10 may be configured with the flexible display, and the flexible display and other configurations may be separate from each other functionally or physically.

The apparatus 12 is an apparatus having a function, and is, for example, an image forming apparatus having image forming functions (for example, a scanning function, a printing function, a copying function, and a facsimile function), a PC, a tablet PC, a smart phone, a mobile phone, a robot (for example, a humanoid robot, an animal-type robot other than a human type, or a robot other than the above-described robots), a projector, a display apparatus such as a liquid crystal display, a recording apparatus, a reproduction apparatus, an imaging apparatus such as a camera, a refrigerator, a rice cooker, a microwave oven, a coffee maker, a cleaner, a washing machine, an air conditioner, a lighting apparatus, a clock, a surveillance camera, an automobile, a motorcycle, an aircraft (for example, an unmanned aerial vehicle (a so-called drone)), a game machine, or various sensing apparatuses (for example, a temperature sensor, a humidity sensor, a voltage sensor, or a current sensor). The apparatus 12 may be an apparatus (for example, an image forming apparatus or a PC) which outputs information to a user, and may be an apparatus (for example, a sensing apparatus) which does not output information to a user. Among a plurality of apparatuses 12 performing a cooperation function which will be described later, all apparatuses 12 may be apparatuses outputting information to a user, some of the apparatuses 12 may be apparatuses outputting information to a user, and the other apparatuses 12 may be information not outputting information to a user, and all of the apparatuses 12 may be apparatuses not outputting information to a user. The conceptual category of the apparatus 12 may include general apparatuses. For example, information apparatuses, video apparatuses, audio apparatuses, and other apparatuses may be included in the conceptual category of the apparatus 12.

In the present exemplary embodiment, a cooperation function is set by using the terminal equipment 10 as an example. The cooperation function is a function which is executable by using one or a plurality of configurations. The configuration is, for example, the apparatus 12 as hardware, software, a function, or a target. The function is a function of the apparatus 12 or the software. The target is, for example, a file (data) or a physical object. The terminal equipment 10 may also be used as an apparatus which executes the cooperation function. The software used for the cooperation function may be installed in the terminal equipment 10, and may be installed in the apparatus 12. The apparatus 12 may independently receive an instruction from a user and execute a function, in a case of not in cooperation with other apparatuses 12. Of course, the apparatus 12 (for example, a sensing apparatus) which executes a function without receiving an instruction from a user may be included in the information processing system.

For example, setting information indicating a cooperation function using the apparatus 12 is stored in the apparatus 12, and the apparatus 12 executes the cooperation function according to the setting information. The setting information may be stored in an apparatus such as a repeater, the terminal equipment 10, or a server controlling the apparatus 12, and the apparatus 12 may execute the cooperation function under the control of an apparatus such as the repeater, the terminal equipment 10, or the server. Setting information indicating a cooperation function using software is stored in an apparatus such as a repeater, the terminal equipment 10, the apparatus 12, or a server in which the software is installed, and the software executes the cooperation function according to the setting information.

Here, the cooperation function will be described. The entire apparatus 12, a specific portion of the apparatus 12, a specific function of software, or an aggregate function including a plurality of functions may be used for the cooperation function. For example, in a case where a function is allocated to each portion of the apparatus 12, the cooperation function may be a function using the portions. Specifically, for example, it is assumed that a printing function is allocated to a main body portion of a multi-function peripheral having a plurality of image forming functions, a scanning function is allocated to a reading portion (for example, a portion corresponding to a document cover, a document glass, or an automatic document feeder) of the multi-function peripheral, and a postprocessing function (for example, a stapling function) is allocated to a postprocessing device of the multi-function peripheral. In this case, the main body portion, the reading portion, or the postprocessing device of the multi-function peripheral may be used for the cooperation function. As software, an aggregate function which is determined in the block unit, such as Robotics Process Automation (RPA), may be used for the cooperation function. In a case where software has a plurality of functions, the cooperation function may be a function using some of the plurality of functions. The aggregate function is configured with a plurality of functions, and the plurality of functions are simultaneously or sequentially executed such that a process is performed according to the aggregate function. The cooperation function may be a function using only hardware, may be a function using only software, and may be a function using both of hardware and software. Data such as an image file or a document file may be used for the cooperation function.

The cooperation function may be a function which is executable through cooperation of a plurality of apparatuses 12 of different types, and may be a function which is executable through cooperation of a plurality of apparatuses 12 of an identical type. The cooperation function may be a function which cannot be used before cooperation. For example, the apparatus 12 (printer) having a printing function cooperates with the apparatus 12 (scanner) having a scanning function, and thus a copying function as the cooperation function is executable. In other words, the copying function is executable through cooperation of the printing function and the scanning function. This is also the same for software. In other words, the cooperation function may be a function which is executable through cooperation of a plurality of pieces of software of different types, and may be a function which is executable through cooperation of a plurality of pieces of software of an identical type.

The conceptual category of the cooperation function may include a combined function in which a new function is executable by causing a plurality of the apparatuses 12 to cooperate with each other. For example, an extended display function as the combined function may be realized by combining a plurality of displays with each other. As another example, a recording function as the combined function may be realized by combining a television set with a recorder. The recording function is, for example, a function of recording images displayed on the television set. An imaging region extending function as the combined function may be realized by combining a plurality of cameras with each other. The extending function is, for example, a function in which imaging is performed by connecting imaging regions of the respective cameras to each other. A translation call function (a function in which a conversation is translated via a telephone) as the combined function may be realized by combining a telephone with a translator or translation software. As mentioned above, the conceptual category of the cooperation function may include a function which is realizable by causing a plurality of apparatuses 12 or a plurality of pieces of software of an identical type to cooperate with each other, and a function which is realizable by causing a plurality of apparatuses 12 or a plurality of pieces of software of different types to cooperate with each other.

A connected home (a system in which the apparatuses 12 such as home appliances are connected to each other via a network by using an IoT technology) may be built by a plurality of apparatuses 12, and the cooperation function may be used in the connected home. In this case, the apparatuses 12 may be connected to each other via a specific server, and the apparatuses 12 may be connected to each other without using a specific server.

A plurality of apparatuses 12 may be caused to cooperate with each other via IFTTT so as to execute the cooperation function. In other words, a content of the cooperation function may be that, in a case where an event serving as a trigger occurs in any apparatus 12, another apparatus 12 performs an action (process). For example, the cooperation function may be executed in which detection of opening of a door in a sensor as the apparatus 12 serves as a trigger, and an action of lighting a lighting apparatus as another apparatus 12 is performed. A function in which an action performed by any apparatus 12 serves as a trigger, and still another apparatus 12 performs an action may also be included in the conceptual category of the cooperation function. A function of causing a plurality of web services to cooperate with each other or API cooperation in which a plurality of systems or services are caused to cooperate with each other by using the Application Programming Interface (API) may be included in the conceptual category of the cooperation function.

In the example illustrated in FIG. 1, the apparatus 12A is a server, the apparatus 12B is a surveillance camera, the apparatus 12C is a video camera, the apparatus 12D is a multi-function peripheral having image forming functions, the apparatus 12E is a notebook PC, the apparatus 12F is a cache register, the apparatus 12G is an entry/exit gate, the apparatus 12H is a TV monitor, the apparatus 12K is a projector, the apparatus 12L is a communication base station, and the apparatus 12M is a repeater (for example, a router). The apparatuses 12A and 12M and the terminal equipment 10 are connected to the apparatus 12L. The apparatuses 12A to 12K are connected to the apparatus 12M. The firewall 14A is provided on a communication path between the apparatus 12A and the apparatus 12L. The firewall 14B is provided on a communication path between the apparatus 12L and the apparatus 12M. The firewall 14C is provided on a communication path between the apparatus 12A and the apparatus 12M.

The apparatus 12N is an air cleaner, the apparatus 12P is an audio apparatus, the apparatus 12Q is a recorder, the apparatus 12R is an air conditioner, the apparatus 12S is a sensor, and the apparatus 12T is a repeater (for example, a router). The apparatuses 12N to 12S are connected to the apparatus 12T. The apparatus 12T is connected to the apparatus 12M. The firewall 14d is provided on a communication path between the apparatus 12T and the apparatus 12M.

For example, pieces of data 16A and 16B (for example, instruction information and a file) are transmitted and received between the terminal equipment 10 and the apparatus 12, or between the apparatuses 12.

The repeater may control another apparatus 12 (for example, hardware of another apparatus 12 and software installed in another apparatus 12) connected to the repeater. The repeater may acquire various pieces of information by using the Internet or the like. The repeater may function as a server, and may manage data and user information. The repeater may be a so-called smart speaker (an apparatus having a wireless communication function and a speaker function), and may be an apparatus which has a communication function but does not have a speaker function. The repeater may be provided indoors (for example, on a floor of a room, a ceiling, or a table), and may be provided outdoors. The repeater may be a movable apparatus (for example, an automatic apparatus).

Each apparatus 12 is configured to automatically execute an independent function in response to a user's instruction or regardless of a user's instruction. Each apparatus 12 may execute a cooperation function set therein. For example, setting information indicating a content of a cooperation function is stored in each apparatus 12 used for the cooperation function, and each apparatus 12 executes the cooperation function indicated by the setting information stored therein in cooperation with other apparatuses 12.

As mentioned above, one or a plurality of pieces of terminal equipment 10 or one or a plurality of apparatuses 12 are present in a real space. One or a plurality of pieces of software are installed in the terminal equipment 10 and each apparatus 12. Of course, the terminal equipment 10 and the apparatus 12 in which software is not installed may be included in the information processing system according to the present exemplary embodiment. The software is present in a virtual space (for example, a virtual space formed by a storage region in which the software is stored).

Figure 2:
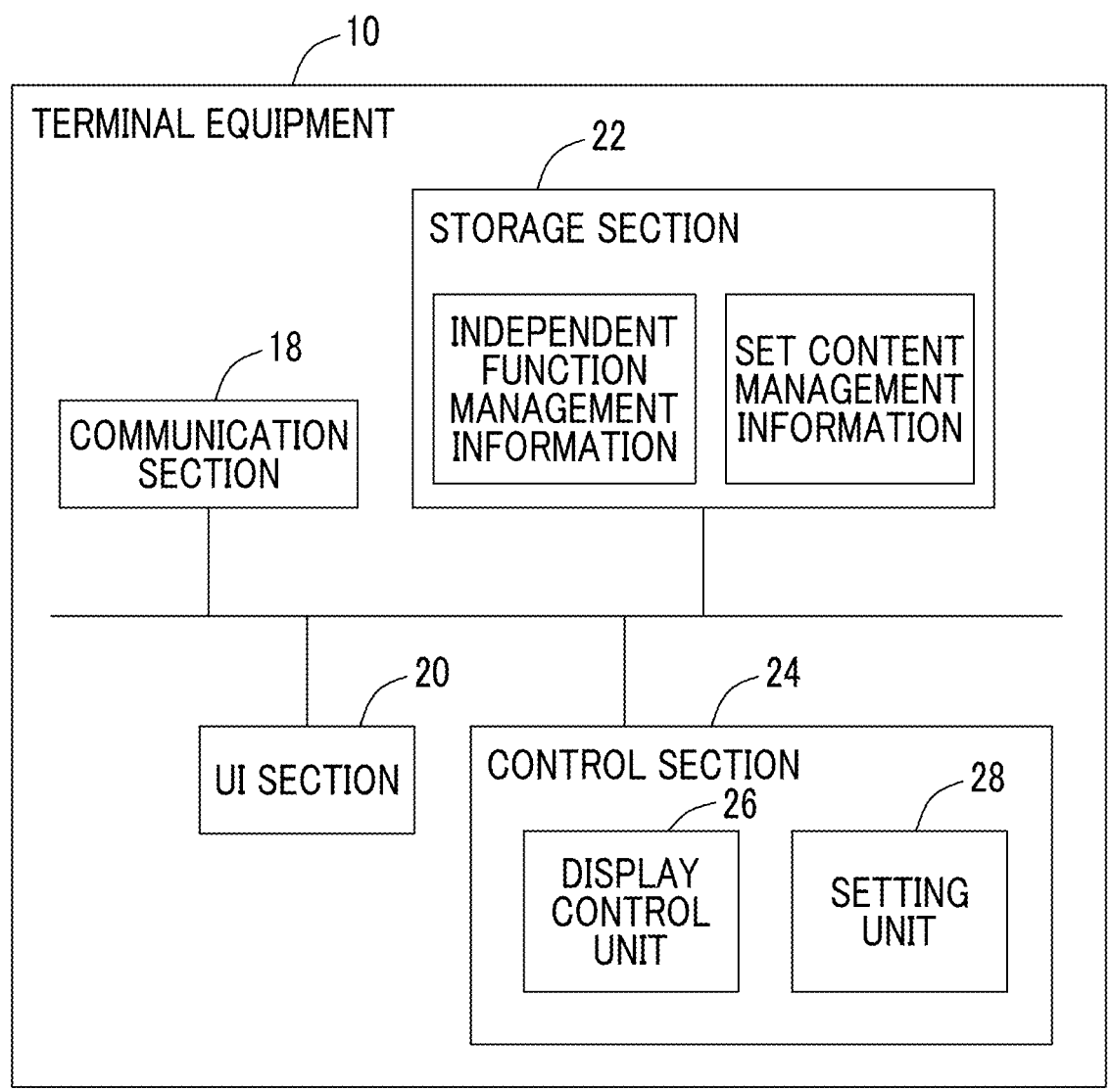
FIG. 2 is a block diagram illustrating a configuration of terminal equipment.

Hereinafter, with reference to FIG. 2, a configuration of the terminal equipment 10 will be described in detail. FIG. 2 illustrates an example of a configuration of the terminal equipment 10.

A communication section 18 is a communication interface, and has a function of transmitting data to other apparatuses, and a function of receiving data from other apparatuses. The communication section 18 may be a communication interface having a wireless communication function, and may be a communication interface having a wired communication function. The communication section 18 may conform to, for example, a single or plural types of communication methods, and may perform communication with a communication partner according to a communication method suitable for the communication partner (that is, a communication method to which the communication partner conforms). The communication method is, for example, infrared communication, visible light communication, Wi-Fi (registered trademark) communication, or short-range radio communication (for example, Near Field Communication (NFC)). As the short-range radio communication, for example, Felica (registered trademark), Bluetooth (registered trademark), or the Radio Frequency Identifier (RFID) is used. The communication section 18 may cope with the 5th Generation (5G). Of course, other types of wireless communication may be used as the short-range radio communication. The communication section 18 may change a communication method or a frequency bandwidth according to a communication partner, and may change a communication or a frequency bandwidth according to a surrounding environment. As the frequency bandwidth, for example, 2.4 GHz or 5 GHz may be used.

A UI section 20 is a user interface section, and includes a display unit and an operation unit. The display unit is a display device such as a liquid crystal display. The display unit may be a flexible display. The operation unit is an input device such as a touch panel or a keyboard. The UI section 20 may be a user interface (including, for example, a touch display or a device in which a keyboard or the like is electronically displayed on a display) which functions as both of a display unit and an operation unit. The UI section 20 may include a sound collecting unit such as a microphone or a sound generation unit such as a speaker. In this case, information may be input to the terminal equipment 10 through voice input, and information may be output with a voice.

A storage section 22 is a storage device such as a hard disk drive or a memory (for example, an SSD). The storage section 22 stores, for example, various pieces of data, and various programs (software). As the programs, an operating system (OS) and various application programs (software) are stored. The storage section 22 stores apparatus address information (for example, an IP address or a MAC address allocated to the apparatus 12) indicating addresses of each apparatus 12. The storage section 22 stores independent function management information and set content management information.

The independent function management information is information for managing functions of each apparatus 12 and each piece of software as configurations, and output contents of data or the like output from each apparatus 12 and each piece of software. For example, the independent function management information is created in advance and is stored in the storage section 22.

The set content management information is information for managing a set cooperation function. For example, in function management information, a combination of configuration identification information for identifying each configuration used for a cooperation function is associated with function information regarding the cooperation function for each cooperation function.

As the configuration identification information, for example, the name or a symbol of a configuration, or an image associated with the configuration is used. The function information includes, for example, identification information such as the name or an ID of a cooperation function, and content information indicating a content of the cooperation function. Hereinafter, an image associated with a configuration will be referred to as a "configuration image".

In a case where a configuration is the apparatus 12, the configuration identification information is information (apparatus identification information) for identifying the apparatus 12. In a case where a configuration is software, the configuration identification information (software identification information) is for identifying the software. In a case where a configuration is a target, the configuration identification information (target identification information) is for identifying the target. The configuration identification information for identifying the apparatus 12 may include information indicating a function of the apparatus 12. Similarly, the configuration identification information for identifying the software may include information indicating a function of the software.

The apparatus identification information is, for example, information indicating the name of the apparatus 12, an apparatus ID, or the type of apparatus 12, a model number of the apparatus 12, information (for example, asset management information) for managing the apparatus 12, information (apparatus position information) indicating a position where the apparatus 12 is provided, an image (apparatus image) associated with the apparatus 12, or apparatus address information. The apparatus image is, for example, an appearance image representing the apparatus 12. The appearance image may be an image representing an outside (for example, a casing of the apparatus) of the apparatus 12, may be an image representing a state (for example, an internal structure) in which a casing is opened, and the inside thereof is viewed from the outside, or an image representing a state in which the apparatus 12 is covered with a packaging sheet. The apparatus image is an image (an image representing an appearance of the apparatus 12 or an image representing the inside thereof) generated by imaging the apparatus 12 with an imaging apparatus such as a camera, and may be an image (for example, an icon) schematically representing the apparatus 12. The apparatus image may be a still image, and may be a moving image. Data of the apparatus image may be stored in the storage section 22, and may be stored in other apparatuses (for example, the apparatus 12 or a server).

The software identification information is, for example, information indicating the name of the software, a software ID, or the type of software, a model number of the software, information for managing the software, an image (software image) associated with the software. The software image is, for example, an image (for example, an icon) representing a function of the software. The software image may be a still image, and may be a moving image. Data of the software image may be stored in the storage section 22, and may be stored in other apparatuses (for example, the apparatus 12 or a server).

The target identification information is, for example, information indicating the name of the target, a target ID, or the type of target, or an image (target image) associated with the target. For example, in a case where the target is a file (data), the name or the like of the file (for example, an image file or a document file) is used as the target identification information. In a case where the target is a physical object (for example, a commodity), the name or the like of the object is used as the target identification information. The target image is an image (a still image or a moving image) generated by imaging a physical target with an imaging apparatus such as a camera, and may be an image (for example, an icon) schematically representing the target. Data of the target image may be stored in the storage section 22, and may be stored in other apparatuses (for example, the apparatus 12 or a server).

The independent function management information and the set content management information may be stored in the apparatus 12 or a server. In this case, such information may not be stored in the terminal equipment 10. Hereinafter, it is assumed that the information is stored in the terminal equipment 10.

A control section 24 is configured to control an operation of each section of the terminal equipment 10. For example, the control section 24 executes various programs (software), controls communication using the communication section 18, controls an information notification (for example, information display and voice output) using the UI section 20, receives information which is input to the terminal equipment 10 by using the UI section 20, writes information into the storage section 22, and reads information from the storage section 22. The control section 24 includes a display control unit 26 and a setting unit 28.

The display control unit 26 is configured to display various pieces of information on the display unit of the UI section 20. For example, the display control unit 26 displays a configuration image associated with a configuration (for example, the apparatus 12, a function, software, or a target) used for a cooperation function, on the display unit. The display control unit 26 displays a configuration image in different ways in cases where the configuration image associated with the configuration used for the cooperation function is displayed in a region for setting the cooperation function and is not displayed in the region.

The setting unit 28 is configured to set a cooperation function in a configuration (for example, the apparatus 12, a function, software, or a target). The setting unit 28 registers information indicating a set content of the cooperation function in the set content management information.

The setting unit 28 may be provided in the apparatus 12, and processes in the setting unit 28 may be performed by the apparatus 12. In this case, the setting unit 28 may not be provided in the terminal equipment 10. Hereinafter, it is assumed that the setting unit 28 is provided in the terminal equipment 10.

Hereinafter, with reference to FIG. 3, the independent function management information will be described in detail. FIG. 3 illustrates an example of an independent function management table as the independent function management information.

In the independent function management table illustrated in FIG. 3, as an example, configuration identification information for identifying the apparatus 12 or software, independent function information indicating an independent function of the apparatus 12 or the software, and information indicating a content (for example, data or an object) output from the apparatus 12 or the software are correlated with each other. The independent function management table is created in advance and is stored in the storage section 22.

The apparatus 12 registered in the independent function management table is the apparatus 12 included in the information processing system. In a case where the new apparatus 12 is added to the information processing system, an independent function and an output content of the apparatus 12 may be registered in the independent function management table. The software registered in the independent function management table is software installed in the terminal equipment 10 or the apparatus 12. In a case where new software is installed in the terminal equipment 10 or the apparatus 12, an independent function and an output content of the software may be registered in the independent function management table. For example, information is transmitted and received between the terminal equipment 10 and each apparatus 12, and thus the independent function management table is updated. Information registered in the independent function management table may be shared by the terminal equipment 10 and each apparatus 12.

Hereinafter, contents registered in the independent function management table will be described in detail.

A sensor A as the apparatus 12 has sensing functions such as a temperature sensing function, a humidity sensing function, and a pressure sensing function, and outputs a sensing result (for example, data such as temperature data, humidity data, or pressure data) as an output content.

A multi-function peripheral B as the apparatus 12 has image forming functions such as a scanning function, a printing function, and a copying function, and outputs image data or printed matter as an output content.

A robot C as the apparatus 12 has, for example, a conveyance function, an imaging function, a conversation function, and a retrieval function, and outputs, for example, image data or voice data as an output content.

An application 1 as software has, for example, a statistical function, and outputs, for example, statistical data as an output content.

An application 2 as software has, for example, a document creation function, and outputs, for example, document data as an output content.

An application 3 as software has, for example, an image processing function, and outputs, for example, image data as an output content.

The apparatuses 12 and the software are only examples, and other apparatuses 12 and software may be registered in the independent function management table. An independent function allocated to each portion of the apparatus 12 may be registered in the independent function management table. For example, in a case where a printing function is allocated to a main body portion B1 of the multi-function peripheral B, information indicating the main body portion B1 and information indicating the printing function are registered in the independent function management table in correlation with each other. Software associated with a file (data) as a target may be registered in the independent function management table.

By referring to the independent function management table, an independent function and an output content of each of the apparatus 12 and the software are specified.

Figure 4:
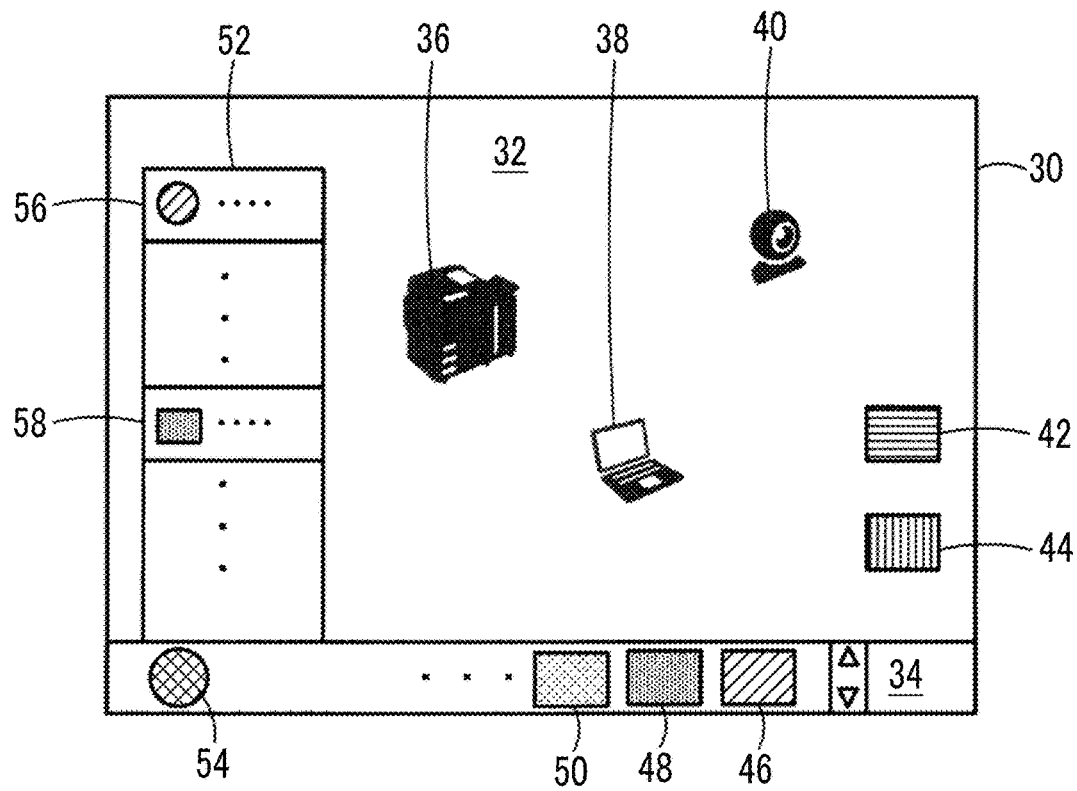
FIG. 4 is a diagram illustrating a screen.

Hereinafter, with reference to FIG. 4, a description will be made of a screen displayed on the display unit of the UI section 20. FIG. 4 illustrates an example of the screen. The display control unit 26 displays a screen 30 on the display unit, and displays various pieces of information on the screen 30. The screen 30 is, for example, a home screen or a desktop screen. The screen 30 includes a main display region 32 and a task bar 34. Images such as icons, and various windows are displayed in the main display region 32. For example, an apparatus image 36 associated with the multi-function peripheral B, an apparatus image 38 associated with a PC (D), an apparatus image 40 associated with the sensor A, an image associated with document software, and an image 44 associated with image management software are displayed in the main display region 32. Images such as icons are displayed in the task bar 34. For example, an image 46 associated with electronic mail software, an image 48 associated with presentation software, and an image 50 associated with document creation software are displayed in the task bar 34. A button image 54 for displaying a menu 52 is displayed in the task bar 34. In a case where a user presses the button image 54 (for example, the user clicks the button image 54), the menu 52 is displayed in the main display region 32. A list of software is displayed in the menu 52. For example, images 56 and 58 associated with the software are displayed in the menu 52. In a case where an arrow button image displayed in the task bar 34 is pressed by the user, an image associated with another piece of software may be displayed in the task bar 34.

For example, the display control unit 26 may display an image associated with the apparatus 12 identified by the terminal equipment 10 or other pieces of equipment on the screen 30, may display an image associated with software installed in the terminal equipment 10 on the screen 30, and may display an image associated with software installed in the apparatus 12 on the screen 30. For example, the apparatus 12 is imaged by an imaging apparatus such as a camera, and the apparatus 12 is identified on the basis of image data which is generated through the imaging. The identification process may be performed by the terminal equipment 10, and may be performed by other pieces of equipment (for example, a server). The display control unit 26 may display an image associated with the apparatus 12 identified in the above-described way on the screen 30. The display control unit 26 may display an image associated with the apparatus 12 connected to the terminal equipment 10 on the screen 30, and may display an image associated with software installed in the apparatus 12 on the screen 30. For example, the terminal equipment 10 retrieves the apparatus 12 connected thereto, and the display control unit 26 displays an image associated with the retrieved apparatus 12 on the screen 30. The display control unit 26 may display an image associated with software installed in the retrieved apparatus 12 on the screen 30. The display control unit 26 may display an image associated with data stored in the terminal equipment 10 on the screen 30, and may display an image associated with data stored in the apparatus 12 on the screen 30.

The screen 30 illustrated in FIG. 4 is only an example of a screen displayed on the display unit, and other screens may be displayed on the display unit. For example, in a case where an operation of setting a cooperation function is performed, other screens may be displayed.

Figure 5:
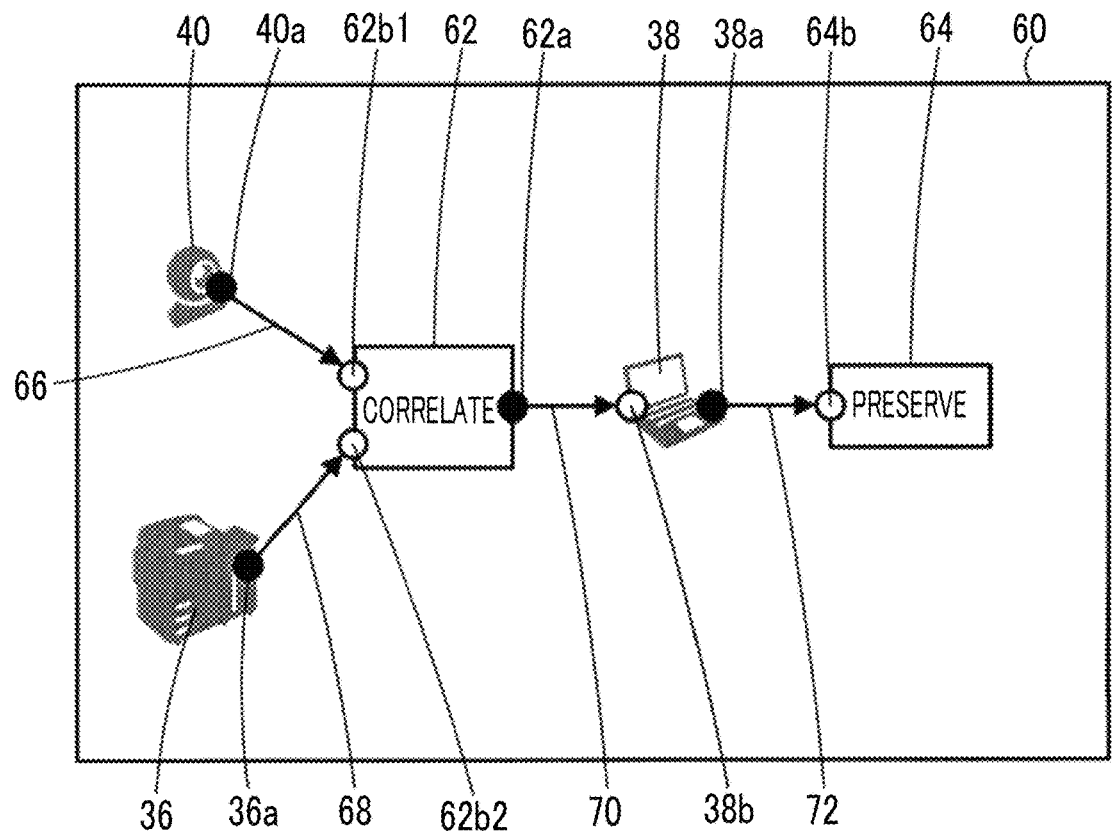
FIG. 5 is a diagram illustrating a screen.

Hereinafter, with reference to FIG. 5, a description will be made of a summary of an operation of setting a cooperation function. FIG. 5 illustrates an example of a screen displayed on the display unit of the UI section 20. The display control unit 26 displays, for example, a screen 60 on the display unit. As examples of configuration images, the apparatus image 36 associated with the multi-function peripheral B, the apparatus image 40 associated with the sensor A, a function image 62 associated with a correlation function, the apparatus image 38 associated with the PC (D), and a function image 64 associated with a preservation function are displayed on the screen 60. Each of the correlation function and the preservation function may be realized by the apparatus 12 as hardware, and may be realized by software.

In a case where the user connects configuration images to each other on the screen 60, the setting unit 28 identifies a configuration associated with each of the plurality of configuration images connected by the user as a configuration used for a cooperation function, and registers the configuration in the set content management information as a configuration used for the cooperation function. An output destination of data output from each configuration is designated by the user, and the setting unit 28 registers information indicating an output destination of data for each configuration in the set content management information.

In a case where the user designates a configuration image associated with a configuration on the screen 60, the display control unit 26 specifies one or a plurality of functions of the configuration associated with the configuration image in the independent function management table, and displays information (a list of functions) indicating the one or plurality of functions on the screen 60. The user designates a function (a function used for a cooperation function) to be executed by the configuration from the list of functions. The user designates a condition for executing the function. For example, condition candidates are associated with each configuration, and information indicating the association is registered in the independent function management table in advance. The display control unit 26 displays a list of condition candidates associated with the configuration designated by the user on the screen 60. The user designates a condition from the list of the candidates. The setting unit 28 sets the function in the configuration as a function used for a cooperation function, sets the condition in the configuration, and registers such a set content in the set content management information.

During execution of a cooperation function, each configuration executes a function associated therewith in a case where a condition associated with the configuration occurs, and outputs data to a data output destination associated with the configuration.

The respective configurations are connected to each other by the user so as to be designated as configurations which all will execute a cooperation function, and the setting unit 28 registers the respective configurations in the set content management information as configurations used for the cooperation function.

Hereinafter, a specific example will be described. For example, in a case where the user performs an operation of connecting the apparatus image 40 to the function image 62 by operating the UI section 20, the display control unit 26 displays an arrow image 66 connecting the apparatus image 40 to the function image 62 on the screen 60. The arrow image 66 corresponds to an example of an image associated with a connection member. The image associated with a connection member is not limited to an image having an arrow shape. Images having other shapes may be used as an image associated with a connection member as appropriate. For example, images associated with a plurality of types of connection members may be stocked, and the user may select and use an image from among the plurality of types of images. As examples of images other than an arrow image, a circular image, a rectangular image, and a curved image may be used. In this case, the setting unit 28 connects the sensor A associated with the apparatus image 40 to the correlation function associated with the function image 62, and registers the sensor A and the correlation function in the set content management information as configurations used for the cooperation function. A destination indicated by the arrow image 66 indicates a data output destination. In the example illustrated in FIG. 5, the arrow image 66 indicates the function image 62, and thus data is output to the correlation function from the sensor A during execution of the cooperation function. In a case where the user designates the apparatus image 40, the display control unit 26 displays a single function or a list of a plurality of functions of the sensor A on the screen 60 by referring to the independent function management table. In a case where the user selects a function to be executed by the sensor A from the list, the setting unit 28 sets the function designated by the user in the sensor A as a function used for the cooperation function, and registers a set content in the set content management information. This is also the same for the correlation function.

The above description is also similarly applied to other configuration images. For example, the apparatus image 36 associated with the multi-function peripheral B and the function image 62 associated with the correlation function are connected to each other via an arrow image 68. The function image 62 and the apparatus image 38 associated with the PC (D) are connected to each other via an arrow image 70. The apparatus image 38 and the function image 64 associated with the preservation function are connected to each other via an arrow image 72. A function used for the cooperation function and a condition for executing the function are designated by the user for each of the multi-function peripheral B, the PC (D), and the preservation function. The setting unit 28 sets the function and the condition designated by the user in each of the multi-function peripheral B, the PC (D), and the preservation function, and registers the set contents in the set content management information. The setting unit 28 registers information indicating a data output destination indicated by each arrow image in the set content management information.

The display control unit 26 displays a connection portion image indicating a portion connected to the arrow image to overlap each configuration image on the screen 60. The arrow image is connected to the connection portion image in the configuration image.

For example, a connection portion image 40*a* is displayed to overlap the apparatus image 40. The arrow image 66 is connected to the connection portion image 40*a* in the apparatus image 40. This is also the same for other configuration images. A connection portion image 36*a* is displayed to overlap the apparatus image 36. Connection portion images 62*a*, 62*b*1, and 62*b*2 are displayed to overlap the function image 62. Connection portion images 38*a* and 38*b* are displayed to overlap the apparatus image 38. A connection portion image 64*b* is displayed to overlap the function image 64. Each arrow image is connected to each connection portion image. A connection portion image may be displayed at a position separated from a configuration image instead of overlapping the configuration image. A display position of a connection portion image may be changed by the user operating the connection portion image.

The connection portion image is an image smaller than a configuration image, and is, for example, a circular image, a rectangular image, or an x-mark image. Of course, the connection portion image may be other images. A part of the configuration image may be used as a connection portion image. A transparent small image may be set in a part of a configuration image as a connection portion image.

Each of the connection portion images indicates output or input of data. For example, in a configuration image, a display region of a connection portion image indicating output of data and a display region of a connection portion image indicating input of data are set. In the example illustrated in FIG. 5, a right region of each configuration image is a display region indicating output of data, and a left region thereof is a display region indicating input of data.

The connection portion image displayed in the display region indicating output of data is an image indicating output of data. The connection portion image displayed in the display region indicating input of data is an image indicating input of data.

In a case where an arrow image is connected to a connection portion image indicating output of data, a configuration associated with a configuration image having the connection portion image outputs data to a configuration indicated by the arrow image. In a case where an arrow image is connected to a connection portion image indicating input of data, data output from another configuration is input to a configuration associated with a configuration image having the connection portion image.

The display control unit 26 may make a display aspect of a connection portion image indicating output of data different from a display aspect of a connection portion image indicating input of data. The display aspect is, for example, a color, a shape, a size, transparency, the presence or absence of linking, or an aspect of linking. For example, a connection portion image indicating output of data is displayed violet, and a connection portion image indicating input of data is displayed red.

In the example illustrated in FIG. 5, the connection portion images 36*a*, 38*a*, 40*a*, and 62*a* are displayed in the display regions indicating output of data, and correspond to connection portion images indicating output of data. The connection portion images 62*b*1, 62*b*2, and 64*b* are displayed in the display regions indicating input of data, and correspond to connection portion images indicating input of data. A plurality of connection portion images (the connection portion images 62*b*1 and 62*b*2) indicating input of data are displayed to overlap the function image 62. As mentioned above, in a single configuration image, a plurality of connection portion images indicating input of data may be displayed, and a plurality of connection portion images indicating output of data may be displayed.

In the example illustrated in FIG. 5, the sensor A, the multi-function peripheral B, the correlation function, the PC (D), and the preservation function are set as configurations used for a cooperation function, and the cooperation function executed by using the configurations is registered in the set content management information.

In a case where execution of a registered cooperation function is set to be active (ON), and a condition occurs, the cooperation function is executed. In a case where execution of a cooperation function is set to OFF, the cooperation function is not executed even if a condition occurs. ON or OFF of execution is set by, for example, the user. Of course, ON and OFF may not be set, and a cooperation function may be executed in a case where a condition occurs.

In a case where execution of a cooperation function is set to be active (ON), and a condition associated with the sensor A occurs, the sensor A outputs data sensed by the sensor A to the correlation function. Similarly, the multi-function peripheral B outputs data generated or acquired by the multi-function peripheral B to the correlation function. Both of the pieces of data are input to the correlation function, and thus a condition associated with the correlation function is satisfied, and thus the correlation function is executed. Consequently, the data from the sensor A is correlated with data from the multi-function peripheral B. The correlation function may be executed by the terminal equipment 10, and may be executed by the apparatus 12. The data from each of the sensor A and the multi-function peripheral B is output to the terminal equipment 10 or the apparatus 12 executing the correlation function. The data from the sensor A and the data from the multi-function peripheral B are output from the correlation function (the terminal equipment 10 or the apparatus 12) to the PC (D) in a state of correlation. The data is input to the PC (D) from the correlation function, and thus a condition associated with the PC (D) is satisfied. Therefore, the PC (D) executes a function set in the PC (D), and outputs data as a result of executing the function to the preservation function (the terminal equipment 10 or the apparatus 12 executing the preservation function). The data is input to the preservation function from the PC (D), and thus a condition associated with the preservation function is satisfied. Therefore, the terminal equipment 10 or the apparatus 12 executes the preservation function, and thus the data output from the PC (D) is preserved in a preservation destination. The setting unit 28 registers information indicating the set content of the cooperation function in the set content management information.

The type of data to be output to another configuration may be changed according to the type of arrow image. For example, it is assumed that the sensor A can output temperature data, humidity data, and pressure data, and the types of arrow images (for example, a color, a shape, or a thickness) are respectively associated with the types of data. For example, temperature data is associated with a red arrow image, and humidity data is associated with a blue arrow image. In a case where the user selects a red arrow image as the arrow image 66 connecting the apparatus image 40 associated with the sensor A with the function image 62, the setting unit 28 sets temperature data in the sensor A as the type of data output from the sensor A to the correlation function, and registers the set content in the set content management information. In this case, during execution of a cooperation function, the sensor A outputs temperature data to the correlation function (the terminal equipment 10 or the apparatus 12). For example, in a case where the user designates the arrow image 66 on the screen 60, the display control unit 26 displays a list of arrow image candidates corresponding to data which can be output from the sensor A on the screen 60. In a case where the user selects an arrow image from the list, the setting unit 28 identifies the type of data output from the sensor A, and sets the type of data in the sensor A. This is also the same for arrow images connected to other configuration images.

A length, a thickness, or a shape of an arrow image may indicate an execution timing or the like of performance or a function of data communication. In other words, an execution timing or the like of performance or a function of data communication may be changed by the user changing a length, a thickness, or a shape of an arrow image.

Figure 6:
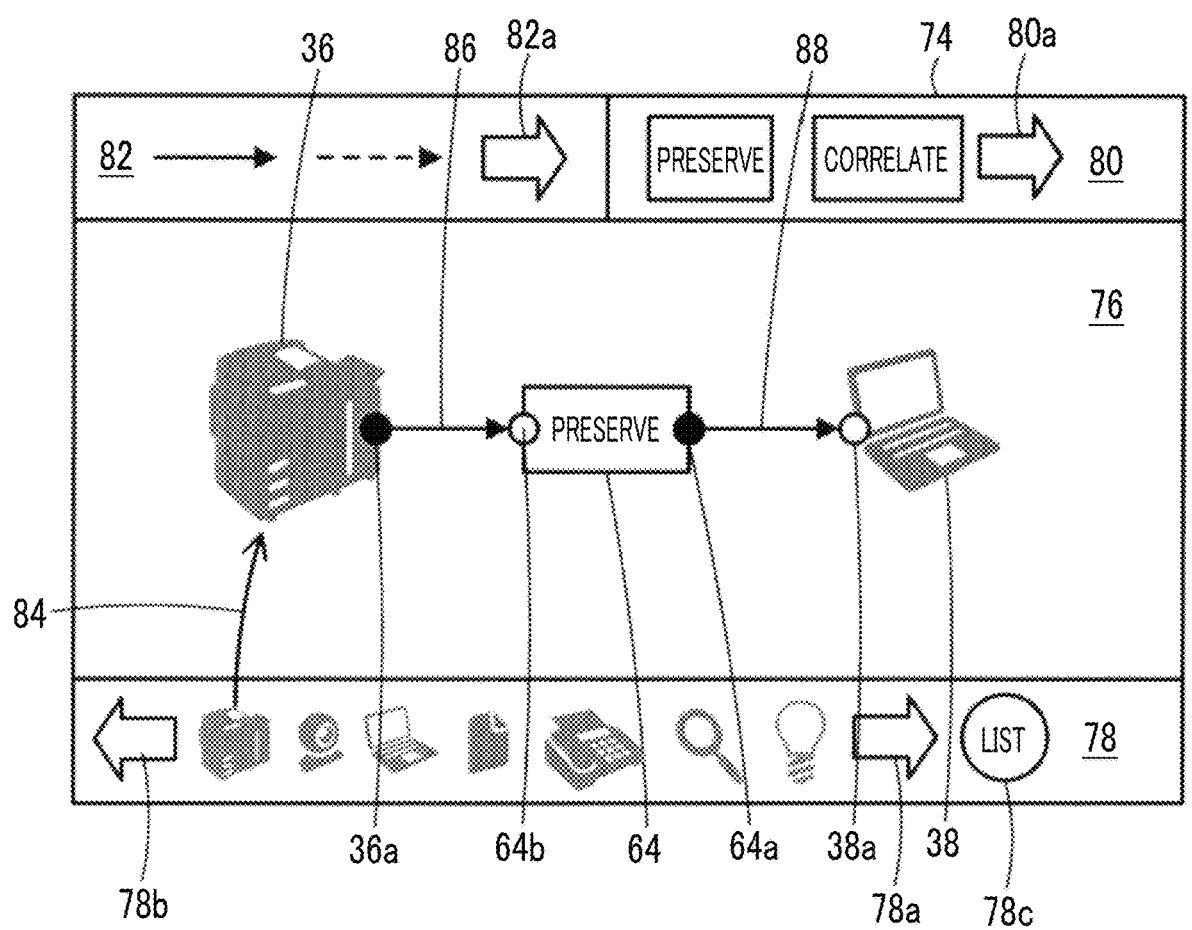
FIG. 6 is a diagram illustrating a screen.

Hereinafter, with reference to FIG. 6, a display aspect of a connection portion image will be described in detail. FIG. 6 illustrates an example of a screen displayed on the display unit of the UI section 20. For example, in a case where a program for setting a cooperation function is executed in response to an instruction from the user, the display control unit 26 displays a screen 74 on the display unit of the UI section 20. The screen 74 includes, for example, a display region 76 for setting a cooperation function, a display region 78 in which stocked configuration images are displayed, a display region 80 in which stocked function images are displayed, and a display region 82 in which stocked arrow images are displayed.

A configuration image associated with a configuration used for a cooperation function is displayed in the display region 76. By connecting configuration images displayed in the display region 76 to each other, the user may designate configurations used for a cooperation function, and may set a function to be executed by each configuration.

One or a plurality of stocked configuration images are displayed in the display region 78. In the display region 78, for example, each configuration image is displayed as a thumbnail image. For example, an apparatus image associated with an apparatus identified by the terminal equipment 10, a software image associated with software installed in the terminal equipment 10, a software image associated with software installed in the apparatus 12 are displayed in the display region 78. Direction key images 78a and 78b are displayed in the display region 78. In a case where the user presses the direction key image 78a (a button image indicating the rightward direction) on the screen 74, each configuration image displayed in the display region 78 is moved in the direction (rightward direction) indicated by the direction key image 78a, and other configuration images are displayed in the display region 78. This is also the same for a case where the direction key image 78b (a button image indicating the leftward direction) is pressed. A button image indicating the upward direction and a button image indicating the downward direction may be displayed, and display of a configuration image is changed in the upward direction or the downward direction. A list button image 78c is displayed in the display region 78. In a case where the user presses the list button image 78c on the screen 74, a list of configuration images is displayed on the screen 74. A connection portion image is not displayed on each configuration image in the display region 78.

One or a plurality of stocked function images are displayed in the display region 80. In the display region 80, for example, each function image is displayed as a thumbnail image. For example, a function image associated with a function of the terminal equipment 10 and a function image associated with a function of the apparatus 12 are displayed in the display region 80. A direction key image 80a is displayed in the display region 80. In a case where the user presses the direction key image 80a on the screen 74, each function image displayed in the display region 80 is moved in the direction (for example, the rightward direction) indicated by the direction key image 80a, and other function images are displayed in the display region 80. A connection portion image is not displayed on each function image in the display region 80.

One or a plurality of arrow images are displayed in the display region 82. An arrow image is an image used to connect configuration images to each other. In a case where one or a plurality of arrow images indicating the type of data to be output, an execution timing of performance or a function of data communication, and the like are prepared, the one or plurality of arrow images are displayed in the display region 82. In a case where the user presses a direction key image 82a on the screen 74, each arrow image displayed in the display region 82 is moved in the direction (for example, the rightward direction) indicated by the direction key image 82a, and other arrow images are displayed in the display region 82.

In a case where the user operates the UI section 20 so as to perform an operation of moving a configuration image displayed in the display region 78 from the display region 78 to the display region 76, the display control unit 26 displays the configuration image in the display region 76 by moving the configuration image from the display region 78 to the display region 76. For example, the display control unit 26 displays a configuration image displayed to be reduced in the display region 78, to be enlarged in the display region 76. In the example illustrated in FIG. 6, as indicated by an arrow 84, the apparatus image 36 displayed in the display region 78 is designated by the user, and is moved to the display region 76. The display control unit 26 enlarges and displays the apparatus image 36 in the display region 76 in response to the operation.

The function images displayed in the display region 80 and the arrow images displayed in the display region 82 are also displayed in the display region 76 in response to the user's operation in the same manner as the apparatus image 36.

In the example illustrated in FIG. 6, in response to the user's operation, the apparatus image 36 associated with the multi-function peripheral B, the function image 64 associated with the preservation function, and the apparatus image 38 associated with the PC (D) are displayed in the display region 76. In the display region 76, a cooperation function is set for such configuration images.

In a case where a configuration image is displayed in the display region 76 for setting a cooperation function, the display control unit 26 displays a connection portion image to overlap the configuration image on the screen 74. This is also the same for a case where a function image is displayed in the display region 76.

For example, in a case where the apparatus image 36 associated with the multi-function peripheral B is moved from the display region 78 to the display region 76 and is displayed in the display region 76 in response to the user's operation, the display control unit 26 displays the connection portion image 36a to overlap the apparatus image 36 in the display region 76. In other words, the connection portion image 36a is not displayed to overlap the apparatus image 36 in the display region 78, but the connection portion image 36a is displayed to overlap the apparatus image 36 in the display region 76. In the example illustrated in FIG. 6, the single connection portion image 36a indicating output of data from the multi-function peripheral B is displayed to overlap the apparatus image 36, but a plurality of connection portion images indicating output of data may be displayed to overlap the apparatus image 36, and a connection portion image indicating input of data to the multi-function peripheral B may be displayed to overlap the apparatus image 36. In a case where the user operates the apparatus image 36 on the screen 74 (for example, the user clicks the apparatus image 36), the display control unit 26 may display at least one of a connection portion image for data output or a connection portion image for data input to overlap the apparatus image 36 in the display region 76. The display control unit 26 may display a connection portion image for data output or a connection portion image for data input to overlap the apparatus image in response to the user's instruction. For example, in a case where the user designates a right region (a region corresponding to data output) of a configuration image (for example, the user clicks the configuration image), the display control unit 26 displays a connection portion image for data output to overlap the configuration image. On the other hand, in a case where the user designates a left region (a region corresponding to data input) of a configuration image, the display control unit 26 displays a connection portion image for data input to overlap the configuration image. This is also the same for the apparatus image 38 associated with the PC (D).

A region corresponding to data output and a region corresponding to data input may be changed by the user. For example, a left region of a configuration image may be set as a region corresponding to data output, and a right region of the configuration image may be set as a region corresponding to data input. An upper region and a lower region may be respectively set as a region for data output and a region for data input. Of course, any region may be set as a region for data output or a region for data input by the user.

In a case where the function image 64 associated with the preservation function is moved from the display region 80 to the display region 76 and is displayed in the display region 76 in response to the user's operation, the display control unit 26 displays connection portion images 64a and 64b to overlap the function image 64 in the display region 76. In other words, the connection portion images 64a and 64b are not displayed to overlap the function image 64 in the display region 80, but the connection portion images 64a and 64b are displayed to overlap the function image 64 in the display region 76. The connection portion image 64a indicating output of data from the preservation function (the terminal equipment 10 or the apparatus 12) and the connection portion image 64b indicating input of data to the preservation function are displayed to overlap the function image 64, but either of the connection portion image 64a or 64b may be displayed, and other connection portion images may be displayed. In the same manner as in the apparatus image 36, a connection portion image may be displayed to overlap the function image 64 in a case where the user operates the function image 64.

A connection portion image is displayed to overlap a configuration image in the display region 76 for setting a cooperation function, and the connection portion image is not displayed to overlap the configuration image in the display regions 78 and 80, and thus a display space of the connection portion image is not allocated in the display regions 78 and 80.

In a case where a connection portion image is displayed to overlap a configuration image, a portion overlapping the connection portion image is not displayed in the configuration image, and the configuration image is displayed in a state in which apart of the configuration image is omitted, but display control is performed as described above, and thus the configuration image is not omitted in the display regions 78 and 80. For example, as a size of the display region 76 is increased in order to improve the operability of the user for cooperation, areas of the display regions 78 and 80 are required to be reduced, and thus configuration images displayed in the display regions 78 and 80 are also displayed to be small according to the areas of the display regions 78 and 80. In this case, in a case where a connection portion image is displayed in each of the display regions 78 and 80, the configuration image displayed to be small is displayed to be omitted by the connection portion image, and thus a situation occurs in which it is hard for the user to view the configuration image. According to the display control, the occurrence of such a situation is prevented.

Since all of a configuration image which a connection portion image for data output is displayed to overlap, a configuration image which a connection portion image for data input is displayed to overlap, and a configuration image which connection portion images for data output and input are displayed to overlap are not required to be created in advance and to be displayed in the display regions 78 and 80, the number of images stocked and displayed in the display regions 78 and 80 is reduced.

In the example illustrated in FIG. 6, the apparatus image 36 and the function image 64 are connected to each other via an arrow image 86, and the function image 64 and the apparatus image 38 are connected to each other via an arrow image 88. A function set in each configuration (the multi-function peripheral B, the preservation function, and the PC (D)) and a condition for executing the function are set by the user. For example, the multi-function peripheral B performs scanning, image data generated due to the scanning is output to the preservation function (the terminal equipment 10 or the apparatus 12), and the image data is output to the PC (D) so as to be preserved in the PC (D) as a result of executing the preservation function. The image data may be directly output to the PC (D) from the multi-function peripheral B. The setting unit 28 registers the cooperation function set in the above-described way, in the set content management information.

An arrow image is extractable from the display region 82, but, in a case where the user performs an operation (for example, a pulling operation) on a connection portion image, the display control unit 26 may display an arrow image extending from the connection portion image on the display unit.

In a case where functions are respectively allocated to portions of a configuration, connection portion images may be respectively displayed for portion images associated with the portions. For example, it is assumed that a printing function is allocated to a main body portion of the multi-function peripheral B, and a stapling function is allocated to a postprocessing portion thereof. In this case, the display control unit 26 displays a connection portion image to overlap a portion image associated with the main body portion in the apparatus image 36 on the display unit, and displays another connection portion image to overlap a portion image associated with the postprocessing portion in the apparatus image 36 on the display unit. In the above-described way, output of data from each portion and input of data to each portion can be separately set.

Modification Example 1

Figure 7:
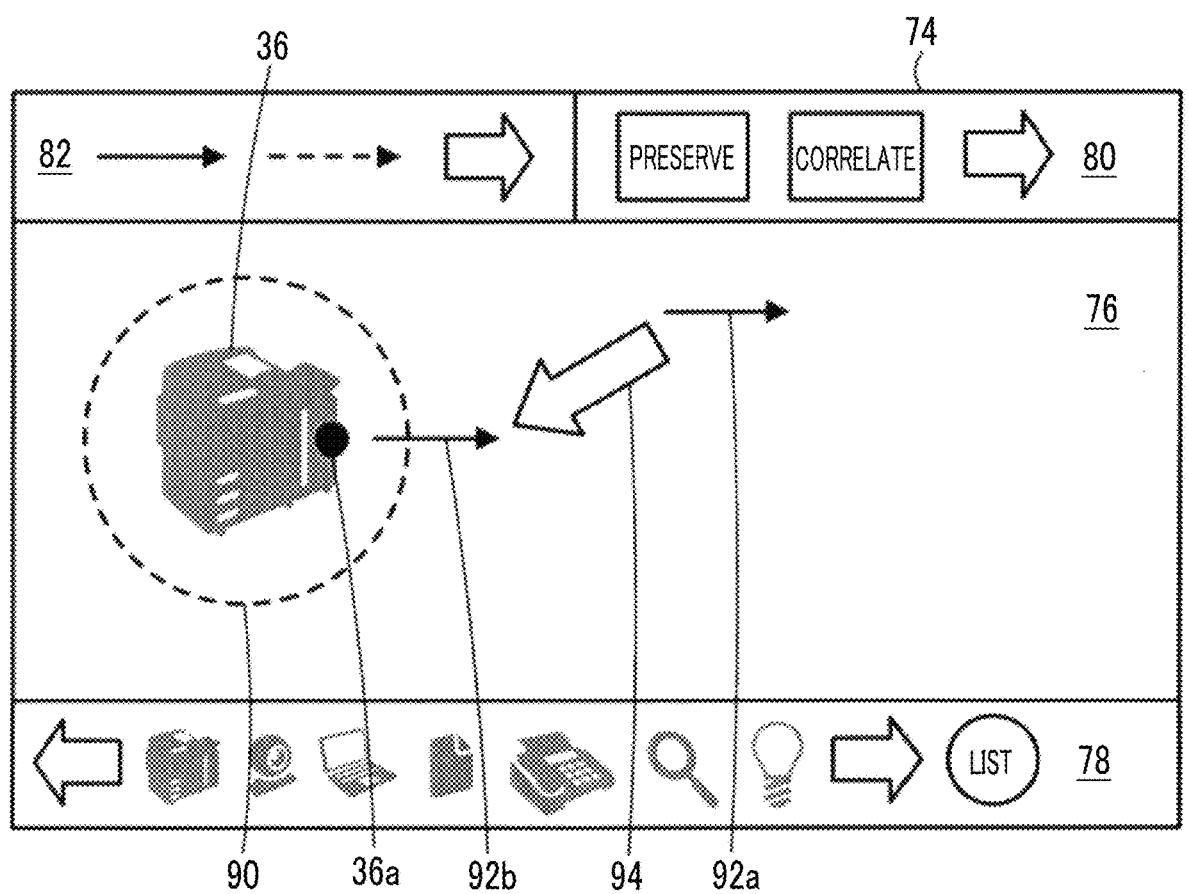
FIG. 7 is a diagram illustrating a screen.

Hereinafter, with reference to FIG. 7, a description will be made of Modification Example 1. FIG. 7 illustrates an example of a screen. In Modification Example 1, in a case where a configuration image is displayed in the display region 76, a connection portion image is displayed to overlap the configuration image on the display unit according to a positional relationship between the configuration image and an arrow image. For example, the display control unit 26 displays the connection portion image to overlap the configuration image on the display unit in a case where a distance between the configuration image and the arrow image is equal to or less than a threshold value in the display region 76, and does not display the connection portion image to overlap the configuration image on the display unit in a case where the distance exceeds the threshold value. The threshold value may be set in advance, and may be changed by the user or the like.

A specific example will be described. As illustrated in FIG. 7, the apparatus image 36 is displayed in the display region 76. A position in a region 90 indicated by a dashed line is a position where a distance from a central position of the apparatus image 36 is equal to or less than a threshold value. A dashed line or the like indicating the region 90 may be displayed, and may not be displayed. In a case where a part or the whole of an arrow image is disposed in the region 90, a dashed line or the like indicating the region 90 may be displayed.

An arrow image 92*a* is displayed outside the region 90 in the display region 76. In this case, the display control unit 26 does not display the connection portion image 36*a* on the display unit. In other words, the connection portion image 36*a* is not displayed to overlap the apparatus image 36.

A part of an arrow image 92*b* is displayed inside the region 90 in the display region 76. In this case, the display control unit 26 displays the connection portion image 36*a* to overlap the apparatus image 36 on the display unit. For example, as indicated by an arrow 94, the connection portion image 36*a* is displayed in a case where the user moves the arrow image displayed outside the region 90 into the region 90. Of course, in a case where the whole of the arrow image 92*b* is displayed in the region 90, the connection portion image 36*a* may be displayed.

In a case where a part or the whole of the arrow image 92*b* is displayed in a right region (a region corresponding to data output) of the apparatus image 36 inside the region 90, the display control unit 26 displays the connection portion image 36*a* for data output to overlap the apparatus image 36 on the display unit. In a case where a part or the whole of the arrow image 92*b* is displayed in a left region (a region corresponding to data input) of the apparatus image 36 inside the region 90, the display control unit 26 displays a connection portion image for data input to overlap the apparatus image 36 on the display unit.

Since a connection portion image is not displayed in a case where a distance between a configuration image and an arrow image exceeds a threshold value, it is possible to prevent the configuration image from being displayed to be omitted due to being displayed to overlap the connection portion image in that case.

A case where a distance between a configuration image and an arrow image is equal to or less than a threshold value is a case where the user tries to connect an arrow image to a configuration image, or a case where an arrow image is on the verge of being connected to a configuration image, and, in other cases, it is supposed that it is not necessary to display a connection portion image. Display or non-display of a connection portion image is controlled according to a positional relationship between a configuration image and an arrow image, and thus the above supposed cases can be coped with.

In a case where a function is allocated to each portion of a configuration, and a distance between a portion image of a configuration image and an arrow image is equal to or less than a threshold value, the display control unit 26 may display a connection portion image to overlap the portion image on the display unit. For example, in a case where a distance between a portion image associated with the main body portion in the apparatus image 36 associated with the multi-function peripheral B and an arrow image is equal to or less than a threshold value, the display control unit 26 displays the arrow image to overlap the portion image associated with the main body portion on the display unit. In this case, in a case where a distance between a portion image associated with the postprocessing portion in the apparatus image 36 and an arrow image exceeds the threshold value, the display control unit 26 does not display the arrow image to overlap the portion image associated with the postprocessing portion. In the above-described way, even in a case where a connection portion image is displayed for each portion image, it is possible to prevent each portion image from being displayed to be unnecessarily omitted.

Modification Example 2

Figure 8:
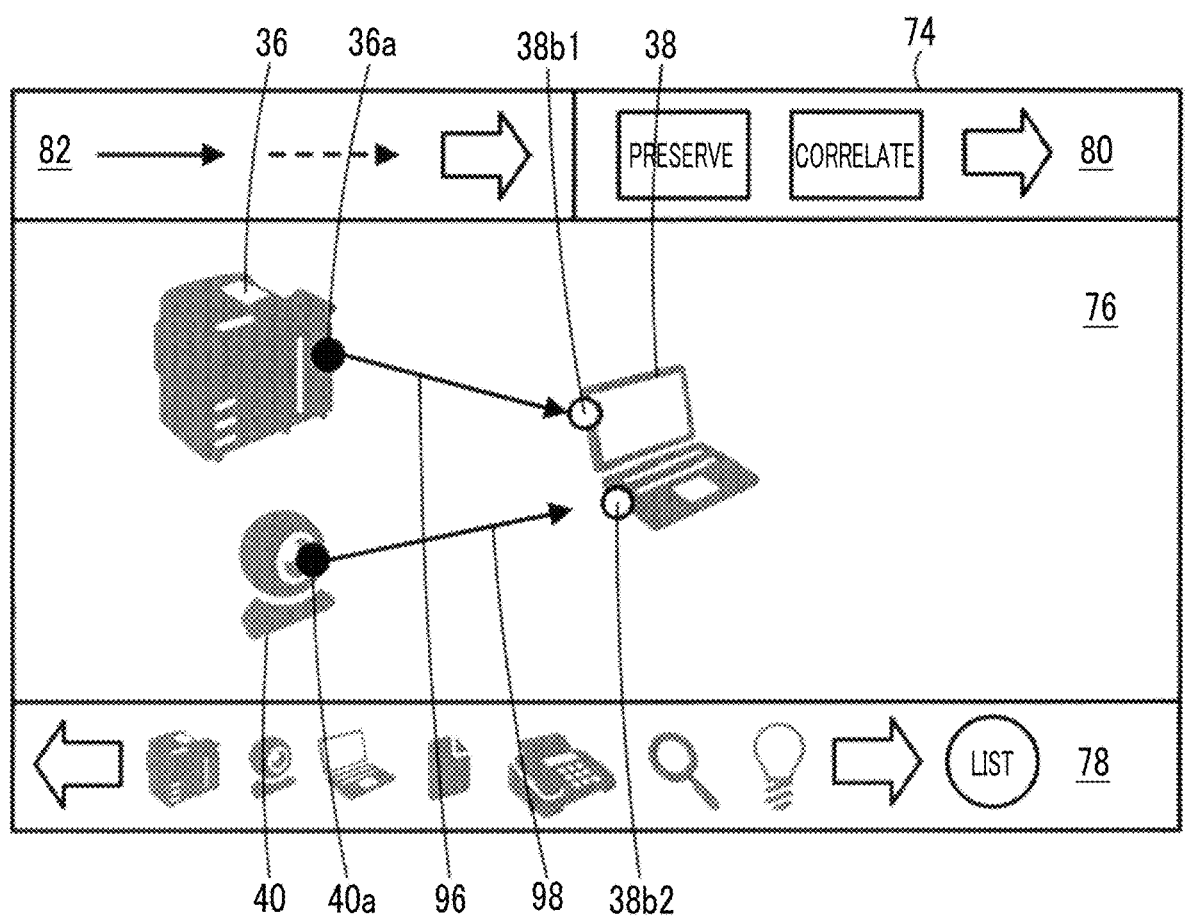
FIG. 8 is a diagram illustrating a screen.

Hereinafter, with reference to FIG. 8, Modification Example 2 will be described. FIG. 8 illustrates an example of a screen. In Modification Example 2, in a case where an arrow image is already connected to a connection portion image of a configuration image, and a distance between another arrow image and the configuration image is equal to or less than a threshold value, the display control unit 26 displays another connection portion image to overlap the configuration image on the display unit.

A specific example will be described. As illustrated in FIG. 8, the apparatus images 36, 38, and 40 are displayed in the display region 76. The apparatus images 36 and 38 are connected to each other via an arrow image 96. Specifically, the connection portion image 36*a* for data output is displayed to overlap the apparatus image 36, a connection portion image 38*b*1 for data input is displayed to overlap the apparatus image 38, and the connection portion image 36*a* and the connection portion image 38*b*1 are connected to each other via the arrow image 96. In this state, in a case where a distance between another arrow image 98 (an arrow image connected to the connection portion image 40*a* for data output displayed to overlap the apparatus image 40) and the apparatus image 38 is equal to or less than a threshold value, the display control unit 26 displays a connection portion image to overlap the apparatus image 38 on the display unit. In the example illustrated in FIG. 8, a connection portion image 38*b*2 for data input is displayed to overlap the apparatus image 38. For example, in a case where a distance between a front end of the arrow image 98 and the apparatus image 38 is equal to or less than a threshold value in a left region (a region corresponding to data input) of the apparatus image 38, the display control unit 26 displays the connection portion image 38*b*2 for data input to overlap the apparatus image 38 on the display unit. In the above-described way, even in a case where an arrow image is already connected to a configuration image, another arrow image can be connected to the configuration image.

Although not illustrated, in a case where a distance between a front end of an arrow image and the apparatus image 38 is equal to or less than a threshold value in a right region (a region corresponding to data output) of the apparatus image 38, the display control unit 26 displays a connection portion image for data output to overlap the apparatus image 38 on the display unit.

The setting unit 28 registers the sensor A, the multifunction peripheral B, and the PC (D) in the set content management information as configurations used for a cooperation function, and registers set contents of the cooperation function executed by the configurations in the set content management information. A function executed by each configuration and a condition for executing the function are set by the user. For example, data sensed by the sensor A and image data generated by the multi-function peripheral B are output to the PC (D), and processing is performed on the data in the PC (D).

Modification Example 3

Figure 9:
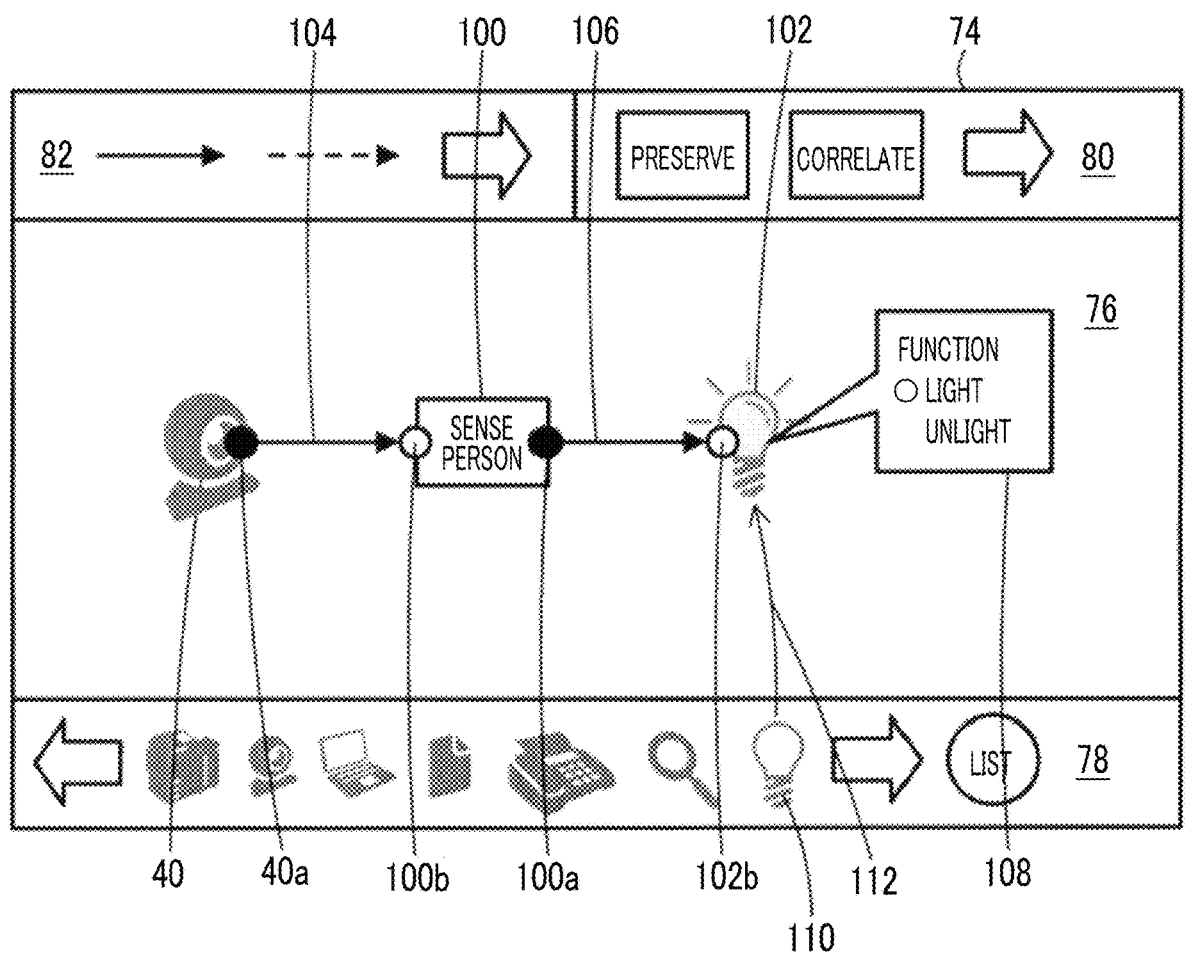
FIG. 9 is a diagram illustrating a screen.

Hereinafter, with reference to FIG. 9, Modification Example 3 will be described. FIG. 9 illustrates an example of a screen. In Modification Example 3, the display control unit 26 changes a configuration image according to a function associated with the configuration which is associated with a configuration image displayed in the display region 76. The display control unit 26 displays a configuration image in a state of not being associated with a function on the display unit before the configuration image is displayed in the display region 76, and changes the configuration image according to the function in a case where the configuration image is displayed in the display region 76.

A specific example will be described. As illustrated in FIG. 9, the apparatus image 40 associated with the sensor A, a function image 100 associated with a person sensing function, and an apparatus image 102 associated with an electric lamp are displayed in the display region 76. The content indicated by the function image 100 may be said to be a function of sensing a person, and may be said to be a condition such as a case of having sensed a person.

The connection portion image 40*a* for data output on the apparatus image 40 and a connection portion image 100*b* for data input on the function image 100 are connected to each other via an arrow image 104. A connection portion image 100*a* for data output on the function image 100 and a connection portion image 102*b* for data input on the apparatus image 102 are connected to each other via an arrow image 106. In other words, in a case where a person is sensed by the sensor A, turning-on or turning-off of the electric lamp is controlled.

For example, in a case where the user designates the apparatus image 102 (for example, the user clicks the apparatus image 102), the display control unit 26 displays a list 108 of functions of the electric lamp associated with the apparatus image 102 on the display unit. For example, the electric lamp has a lighting function and an unlighting function. The user may select a function to be executed by the electric lamp from the list 108. The display control unit 26 changes the apparatus image 102 according to the function selected by the user. For example, in a case where the user selects the lighting function, the display control unit 26 displays the apparatus image 102 indicating lighting on the display unit. On the other hand, in a case where the user selects the unlighting function, the display control unit 26 displays an apparatus image (an image which is different from the apparatus image 102) indicating unlighting on the display unit. In a case where the lighting function is selected by the user, and a cooperation function is set, the electric lamp is lighted at the time of a person being sensed by the sensor A. On the other hand, in a case where the unlighting function is selected by the user, and a cooperation function is set, the electric lamp is unlighted at the time of a person being sensed by the sensor A. As mentioned above, an apparatus image is changed according to a function set in the apparatus 12. This is also the same for a function set in software.

Since a configuration image is changed according to a function, and thus a configuration image in which the function is reflected is displayed, the function set in the configuration image can be visually delivered to the user.

It is not necessary to separately create a configuration image in which each function is reflected. For example, instead of separately creating an apparatus image associated with the lighting function and an apparatus image associated with the unlighting function and of displaying the apparatus images in the display region 78 as stocked images, the number of stocked images displayed in the display region 78 can be reduced by displaying an apparatus image (basic image) which can switch between the lighting function and the unlighting function in the display region 78 as a stocked image. In the example illustrated in FIG. 9, an apparatus image 110 (a basic image associated with the electric lamp) which is associated with the electric lamp and in which neither the lighting function nor the unlighting function is reflected is displayed in the display region 78 as a stocked image. In other words, the apparatus image 110 may be said to be an image indicating an electric lamp in a state of not being associated with a function. As indicated by an arrow 112, in a case where the apparatus image 110 is moved from the display region 78 to the display region 76 in response to the user's operation so as to be displayed in the display region 76, and a function (for example, the lighting function) is set in the electric lamp, the apparatus image 110 is changed to an apparatus image (for example, the apparatus image 102) in which the set function is reflected.

Configuration images in which respective functions are reflected may be separately created and displayed in the display region 78.

Figure 10:
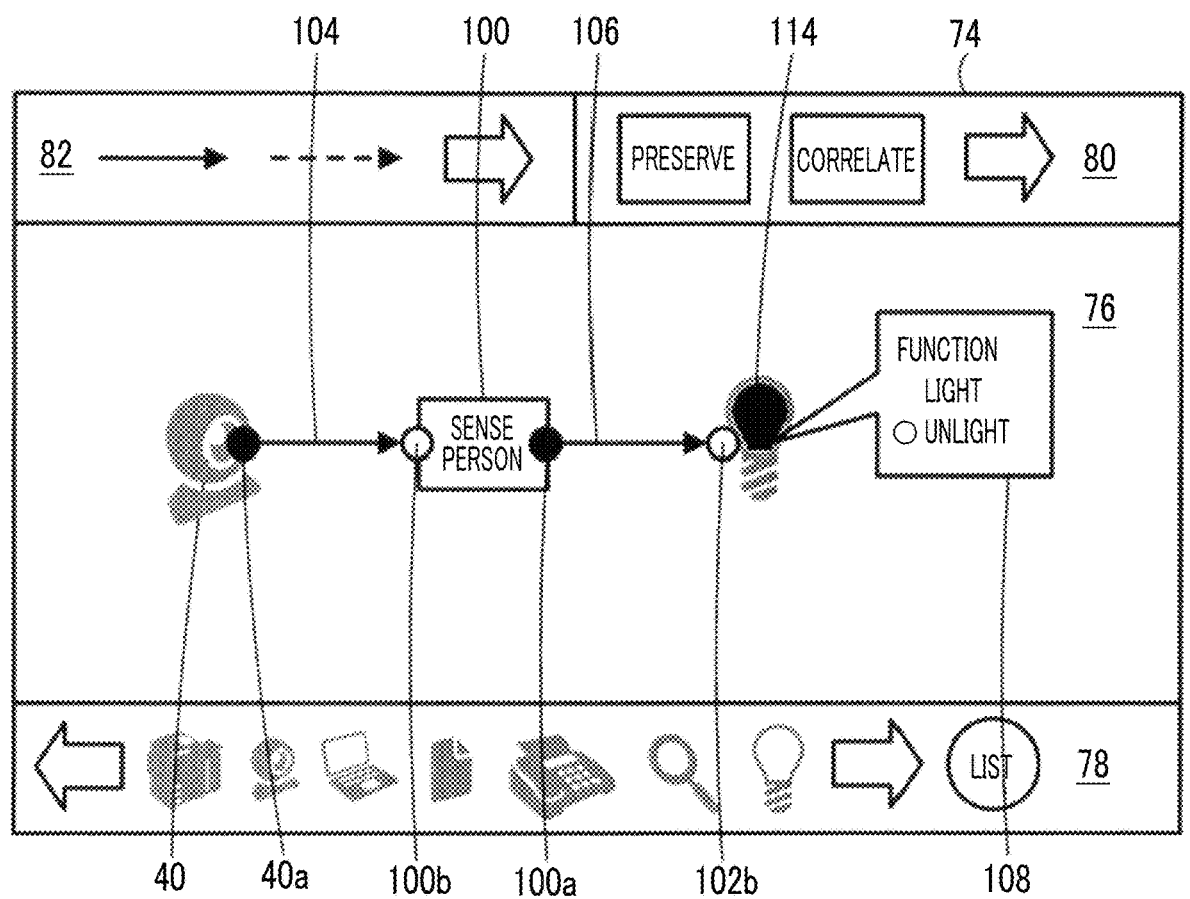
FIG. 10 is a diagram illustrating a screen.

FIG. 10 illustrates an apparatus image 114 in a case where the unlighting function is selected by the user. The apparatus image 114 is an image indicating unlighting. The unlighting function is included in a cooperation function by the apparatus image 114. In this case, as described above, in a case where a person is sensed by the sensor A, the electric lamp is unlighted.

In a case where display of a configuration image is changed, the setting unit 28 changes a cooperation function to be set according to the change. For example, in a case where the lighting function is set, and the apparatus image 102 indicating lighting is displayed, the setting unit 28 sets a cooperation function including the lighting function. In a case where the lighting function is changed to the unlighting function, and the apparatus image 102 is changed to the apparatus image 114 indicating unlighting, the setting unit 28 changes the cooperation function including the lighting function to a cooperation function including the unlighting function. As mentioned above, a cooperation function can be changed by changing a configuration image.

Figure 11:
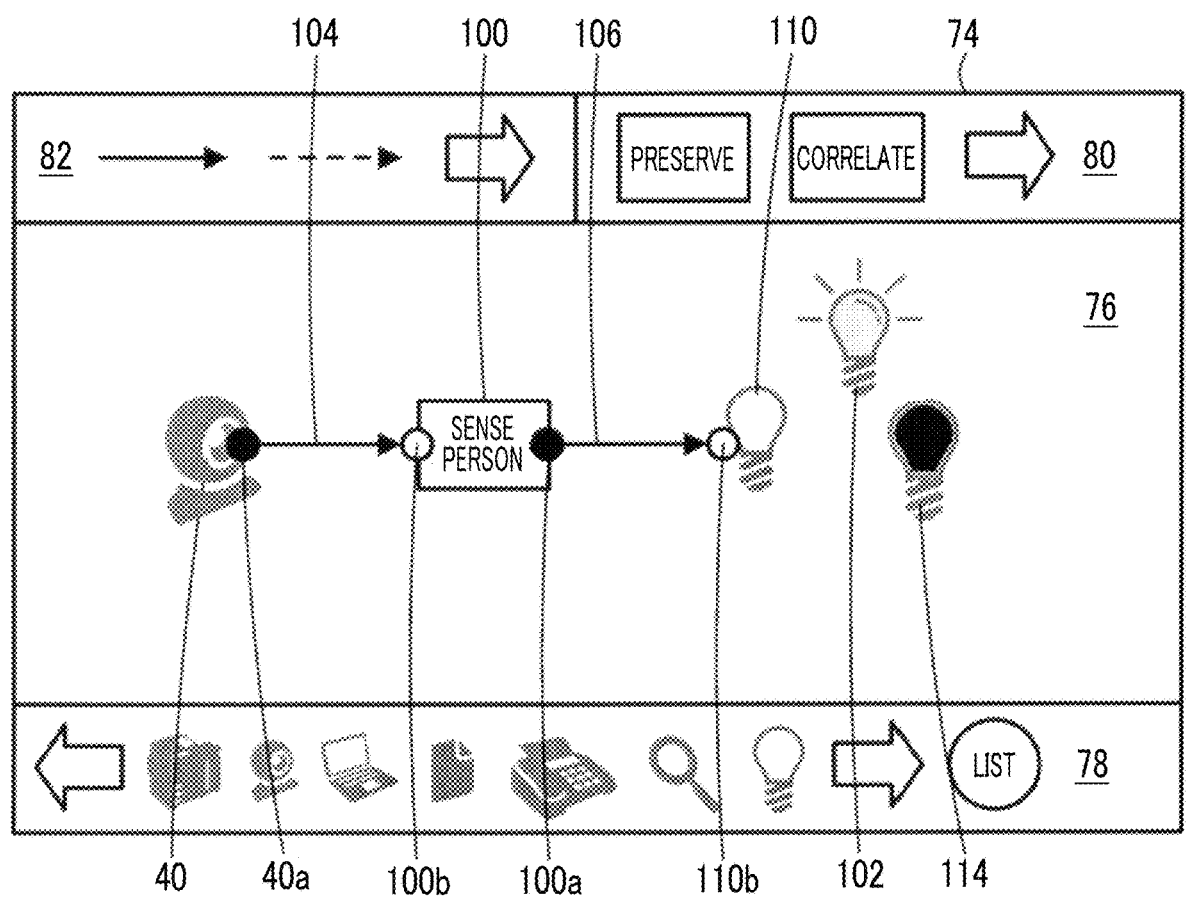
FIG. 11 is a diagram illustrating a screen.

In a case where a configuration image (basic image) displayed in the display region 78 as a stocked image is displayed in the display region 76 in response to the user's operation, the display control unit 26 may display candidates of configuration images in which respective functions of a configuration associated with the configuration image are reflected on the display unit. As illustrated in FIG. 11, for example, it is assumed that the apparatus image 110 associated with the electric lamp is moved from the display region 78 to the display region 76 so as to be displayed in the display region 76. Since the electric lamp has the lighting function and the unlighting function, the display control unit 26 displays the apparatus image 102 in which the lighting function is reflected and the apparatus image 114 in which the unlighting function is reflected around the apparatus image 110 as candidates of configuration images in the display region 76. The display control unit 26 may display the apparatus images 102 and 114 in a translucent state on the display unit, and may display the apparatus images 102 and 114 in a state of being reduced more than the apparatus image 110 which is a basic image on the display unit. Of course, as another display aspect, the display control unit 26 may display the apparatus images 102 and 114 on the display unit in an aspect which is different from that of the apparatus image 110 as a basic image.

In a case where the user selects an apparatus image of the apparatus images 102 and 114, the display control unit 26 displays the selected apparatus image in the display region 76, and does not display the unselected apparatus image and the apparatus image 110 (basic image). The setting unit 28 sets a function associated with the selected apparatus image as a function included in a cooperation function.

In the display region 76, candidates of configuration images are displayed around a basic image, and thus candidates of functions of configurations associated with the configuration images are presented to the user.

The display control unit 26 may display information indicating candidates of functions to be set in configurations on the display unit according to a relationship between the configurations displayed in the display region 76. For example, it is assumed that a function of lighting the electric lamp in a case where a person is sensed is set in the electric lamp as a function prioritized more than a function of unlighting the electric lamp in a case where a person is sensed. In this case, in a case where the function image 100 associated with the person sensing function is displayed in the display region 76, the display control unit 26 displays the apparatus image 102 in which lighting is reflected on the display unit, and does not display the apparatus image 114 in which unlighting is reflected. As mentioned above, a function supposed to be used through a combination with other configurations may be set in advance for each configuration so as to be associated with the configuration, and the display control unit 26 may display a configuration image in which the function supposed to be used in combination with other configurations according to the association is reflected on the display unit. In the above-described way, candidates of configuration images are narrowed. Information indicating the association is stored in, for example, the terminal equipment 10 or the apparatus 12.

Figure 12:
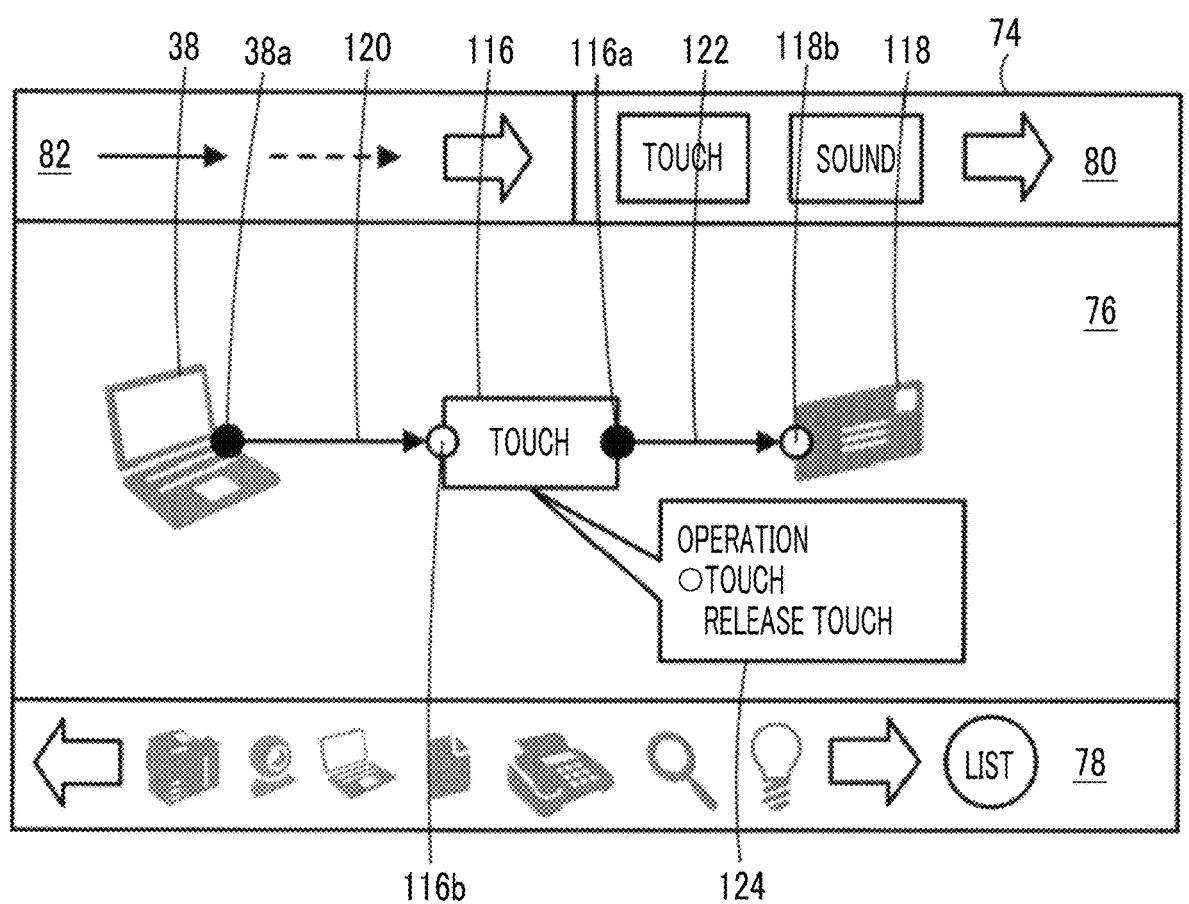
FIG. 12 is a diagram illustrating a screen.

In the examples illustrated in FIGS. 9 to 11, a configuration image is changed according to a set function, but text indicating a function, a condition, a process, or a role may be changed. With reference to FIG. 12, this process will be described. As illustrated in FIG. 12, the apparatus image 38 associated with the PC (D), a function image 116 associated with a touch operation, and a function image 118 associated with an electronic mail function are displayed in the display region 76. The content indicated by the function image 116 associated with the touch operation may be said to be a function regarding the touch operation, and may be said to be a condition regarding the touch operation.

The connection portion image 38a for data output on the apparatus image 38 and a connection portion image 116b for data input on the function image 116 are connected to each other via an arrow image 120. A connection portion image 116a for data output on the function image 116 and a connection portion image 118b for data input on the function image 118 are connected to each other via an arrow image 122. In other words, in a case where a condition regarding the touch operation is satisfied, electronic mail software is activated in the PC (D).

For example, in a case where the user designates the function image 116 (for example, the user clicks the function image 116), the display control unit 26 displays a list 124 of touch operations associated with the function image 116 on the display unit. For example, as a specific content of the touch operation, "touch" and "release touch" are included in the list 124. The user may select a specific content of the touch operation from the list 124. The display control unit 26 changes the function image 116 according to the touch operation selected by the user. For example, in a case where the user selects "touch", the display control unit 26 changes the text displayed in the function image 116 to text "touch". On the other hand, in a case where the user selects "release touch", the display control unit 26 changes the text displayed in the function image 116 to text "release touch". In a case where "touch" is selected as a specific content of the touch operation by the user, a cooperation function is set, and the touch operation is performed on the PC (D), the electronic mail software is activated in the PC (D). On the other hand, in a case where "release touch" is selected as a specific content of the touch operation by the user, a cooperation function is set, and the touch operation on the PC (D) is released, the electronic mail software is activated in the PC (D).

Since text displayed in a function image is changed according to a function, a condition, a process, or a role, a function or the like set in a function image can be visually delivered to the user.

It is not necessary to create both of a function image indicating an operation such as "touch" and a function image indicating an operation such as "release touch" in advance and to display the function images in the display region 80 as stocked images. For example, a function image in which the text "touch" is displayed is displayed in the display region 80, the function image is displayed in the display region 76, and, in a case where the function image is designated by the user, the list 124 is displayed. In a case where a specific operation is selected by the user from the list 124, a function image (for example, the function image 116) including text indicating the selected operation (for example, "touch") is displayed. In this case, the function image including the text "touch" displayed in the display region 80 corresponds to a basic image. In the above-described way, the number of stocked image displayed in the display region 80 can be reduced compared with a case where both a function image indicating an operation such as "touch" and a function image indicating an operation such as "release touch" are displayed in the display region 80.

Function images indicating respective operations may be separately created and be displayed in the display region 78.

The display control unit 26 may display specific contents regarding the touch operation on the display unit as candidates according to a relationship with another configuration. For example, an operation supposed to be executed in combination with other configurations may be set in advance, and the display control unit 26 may display a function image including text indicating the executed operation according to the setting on the display unit. For example, activation of the PC (D), the touch operation, and the electronic mail software is set in advance as prioritized setting, and the apparatus image 38 associated with the PC (D) and the function image 118 associated with the electronic mail software are displayed in the display region 76, the display control unit 26 displays the function image 116 including the text "touch" in the display region 76.

Modification Example 4

Figure 13:
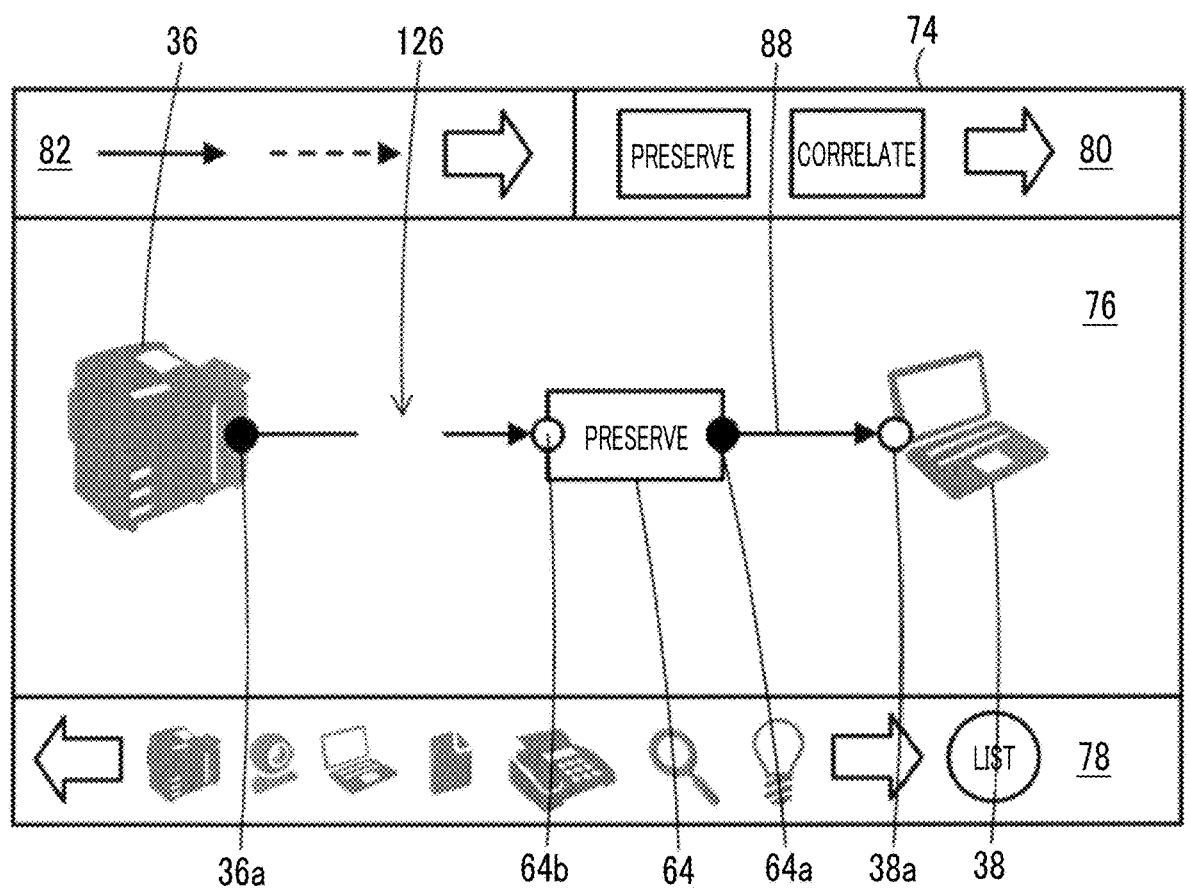
FIG. 13 is a diagram illustrating a screen.

Hereinafter, with reference to FIG. 13, Modification Example 4 will be described. FIG. 13 illustrates an example of a screen. In Modification Example 4, in a case where a plurality of configuration images associated with a plurality of configurations used for a cooperation function are connected to each other, the setting unit 28 cancels the cooperation of the plurality of configurations in a case where a configuration image is operated by the user, and an operation amount is equal to or more than a threshold value. In this case, the setting unit 28 deletes a set content of the canceled cooperation function from the set content management information, and cancels the cooperation function set in each configuration.

The operation may include, for example, an operation of moving a configuration image on a screen, an operation of twisting an arrow image, and an operation of cutting an arrow image. The operation amount may include, for example, a movement amount of a configuration image, and a twisting amount of an arrow image.

A specific example will be described. As illustrated in FIG. 13, for example, the apparatus image 36 associated with the multi-function peripheral B, the function image 64 associated with the preservation function, and the apparatus image 38 associated with the PC (D) are displayed in the display region 76. It is assumed that the apparatus image 36 and the function image 64 are connected to each other via an arrow image, and the function image 64 and the apparatus image 38 are connected to each other via an arrow image. In this state, for example, in a case where the user moves the function image 64 far away from the apparatus image 36, and a movement amount thereof is equal to or more than a threshold value, the display control unit 26 cuts the arrow image which connects the apparatus image 36 to the function image 64, and displays an image indicating the cut state on the display unit as indicated by the reference numeral 126. The setting unit 28 cancels cooperation of the multi-function peripheral B and the preservation function. Of course, the arrow image may be cut by operating the apparatus image 36. The threshold value may be set in advance, and may be changed by the user or the like. Even in a case where the arrow image is cut, the arrow image 88 connecting the function image 64 to the apparatus image 38 is not cut unless a cutting condition is satisfied.

In a case where the arrow image connecting the apparatus image 36 to the function image 64 is cut, and then a predetermined time elapses, the display control unit 26 may not display the cut arrow image. For example, the display control unit 26 may not display the cut arrow image connected to the function image 64, and may display the cut arrow image connected to the apparatus image 36 on the display unit in a state of being connected to the apparatus image 36. Of course, the display control unit 26 may not display the cut arrow image connected to the apparatus image 36, and may display the cut arrow image connected to the function image 64 on the display unit in a state of being connected to the function image 64. The display control unit 26 may not display the connection portion images 36*a* and 64*b*.

As another example, in a case where the user moves the function image 64 far away from the apparatus image 36 at movement velocity or movement acceleration which is equal to or more than a threshold value, the display control unit 26 may cut the arrow image connecting the apparatus image 36 to the function image 64, and the setting unit 28 may cancel the cooperation function.

Figure 14:
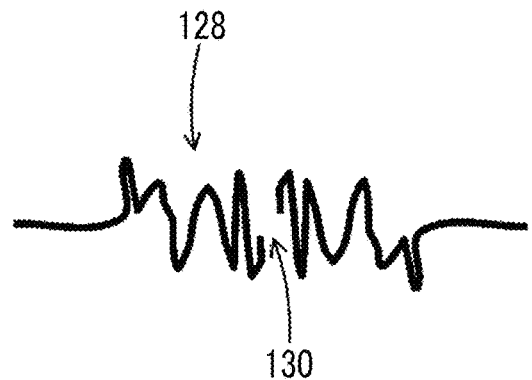
FIG. 14 is a diagram illustrating a state in which an arrow image is cut.

As illustrated in FIG. 14, in a case where the user twists an arrow image 128 connecting configuration images to each other, and a twisting amount is equal to or more than a threshold value, the display control unit 26 may cut the arrow image 128 as indicated by the reference numeral 130.

In a case where the user moves a configuration image on the screen, and brings the configuration image into contact with another configuration image at movement velocity or movement acceleration which is equal to or more than a threshold value, the setting unit 28 may cancel a cooperation function set between a configuration associated with the configuration image and another configuration associated with another configuration image. In this case, the display control unit 26 may display an image indicating a state in which the configuration associated with the moved configuration image is destroyed on the display unit. For example, in a case where the apparatus image associated with the electric lamp is moved and is brought into contact with another configuration image, an image indicating a broken electric lamp is displayed. In a case where a configuration image associated with a fragile object is brought into contact with another configuration image, the cancellation may be performed. The fragile object is set in advance. For example, a glass product such as an electric lamp is registered as the fragile object.

The display control unit 26 may reflect the weight of the apparatus 12 in an aspect of movement of an apparatus image. For example, an apparatus image associated with the heavy apparatus 12 may have a small movement amount for a movement operation, and may be hardly moved.

Modification Example 5

Figure 15:
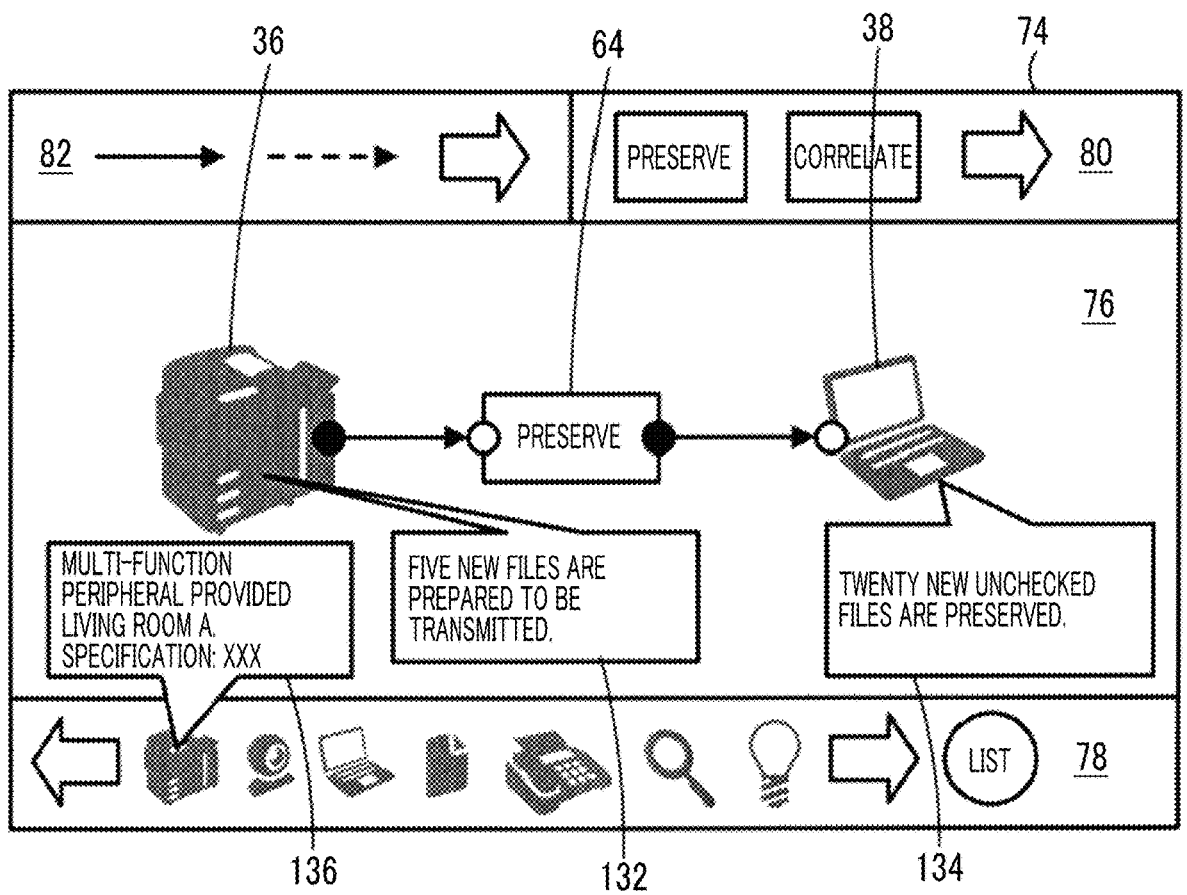
FIG. 15 is a diagram illustrating a screen.

Hereinafter, with reference to FIG. 15, Modification Example 5 will be described. FIG. 15 illustrates an example of a screen. In Modification Example 5, the display control unit 26 makes display contents of states of each configuration different between a case where a cooperation function is set and a case where the cooperation function is not set.

For example, as illustrated in FIG. 15, the apparatus images 36 and 38, and the function image 64 are displayed in the display region 76, and a cooperation function is assumed to be set in the multi-function peripheral B, the preservation function, and the PC (D). In this case, in a case where the user designates the apparatus image 36 (for example, the user clicks the apparatus image 36) on the screen, the display control unit 26 displays information 132 indicating a state of the multi-function peripheral B regarding the set cooperation function on the display unit. The information indicating a state regarding the cooperation function is, for example, information indicating an execution situation of the cooperation function or information indicating execution history of the cooperation function. For example, the set cooperation function is that image data (file) generated through scanning in the multi-function peripheral B is transmitted to the PC (D), and is preserved in the PC (D). In this case, information (for example, information indicating an execution situation or history information) regarding the scanning in the multi-function peripheral B is displayed as the information 132. For example, the information 132 indicating that five files (image data) are generated through scanning in the multi-function peripheral B and are prepared to be transmitted is displayed. The information 132 may be said to be information indicating an execution situation of scanning. In a case where the user designates the apparatus image 38 on the screen, the display control unit 26 displays information 134 indicating a state of the PC (D) regarding the set cooperation function on the display unit. For example, information regarding preservation in the PC (D) is displayed as the information 134. In the example illustrated in FIG. 15, the information 134 indicating that twenty new files have been preserved is displayed.

On the other hand, in a case where the user designates a configuration image associated with a configuration in which the cooperation function is not set, the display control unit 26 displays information having no relation to the cooperation function on the display unit. For example, in a case where the user designates the apparatus image associated with the multi-function peripheral B displayed in the display region 78, the display control unit 26 displays information 136 indicating performance or the like of the multi-function peripheral B on the display unit.

The display control unit 26 acquires information indicating a state, performance, and the like of the apparatus 12 from the apparatus 12 via a communication path. In a case where the user designates a configuration image associated with software, the display control unit 26 acquires information indicating a state, performance, and the like of the software from the terminal equipment 10 or the apparatus 12 in which the software is installed, and displays the information on the display unit. Also in this case, displayed information differs in a case where a cooperation function is set in the software and a case where the cooperation function is not set in the software.

Modification Example 6

Figure 16:
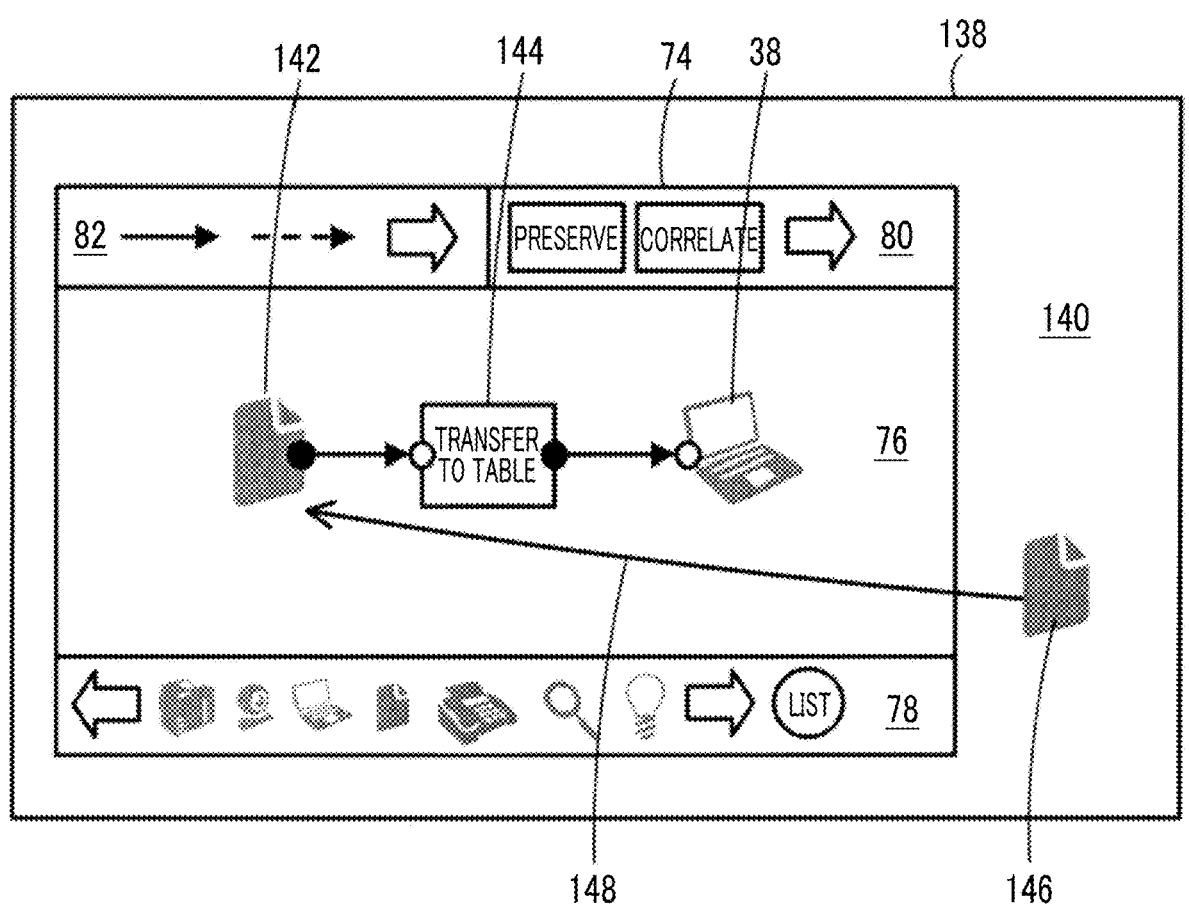
FIG. 16 is a diagram illustrating a screen.

Hereinafter, with reference to FIG. 16, Modification Example 6 will be described. FIG. 16 illustrates an example of a screen. For example, a screen 138 may be displayed on the display unit of the UI section 20, and the screen 74 for setting a cooperation function may be displayed in a display region 140 of the screen 138. The screen 138 is, for example, a desktop screen or a home screen.

A file image 142 associated with data (file), a function image 144 associated with a table transfer function, and the apparatus image 38 associated with the PC (D) are displayed in the display region 76, and a cooperation function is set in the data, the table transfer function, and the PC (D). For example, a cooperation function that a designated file is transmitted to the PC (D) and the file is transferred to a table in the PC (D) is set.

A file image 146 associated with the file is displayed in the display region 140.

It is assumed that the table transfer function (the terminal equipment 10 or the apparatus 12) having received a file serves as a trigger, and thus the cooperation function is executed. In this case, after setting of the cooperation function is completed, for example, in a case where the file image 146 displayed in the display region 140 is moved to the display position of the file image 142 as indicated by an arrow 148, to a display position of an arrow image connecting the configuration images to each other, or the display position of the function image 144 associated with the table transfer function in the display region 76 through the user's operation, the movement may serve as a trigger, and thus the cooperation function may be executed. In a case where the trigger based on the movement of the file image 146 is sensed, the control section 24 starts execution of the cooperation function. For example, the control section 24 executes the cooperation function by controlling the apparatus 12 and software used for the cooperation function. The cooperation function is executed through such a file operation.

Modification Example 7

Figure 17:
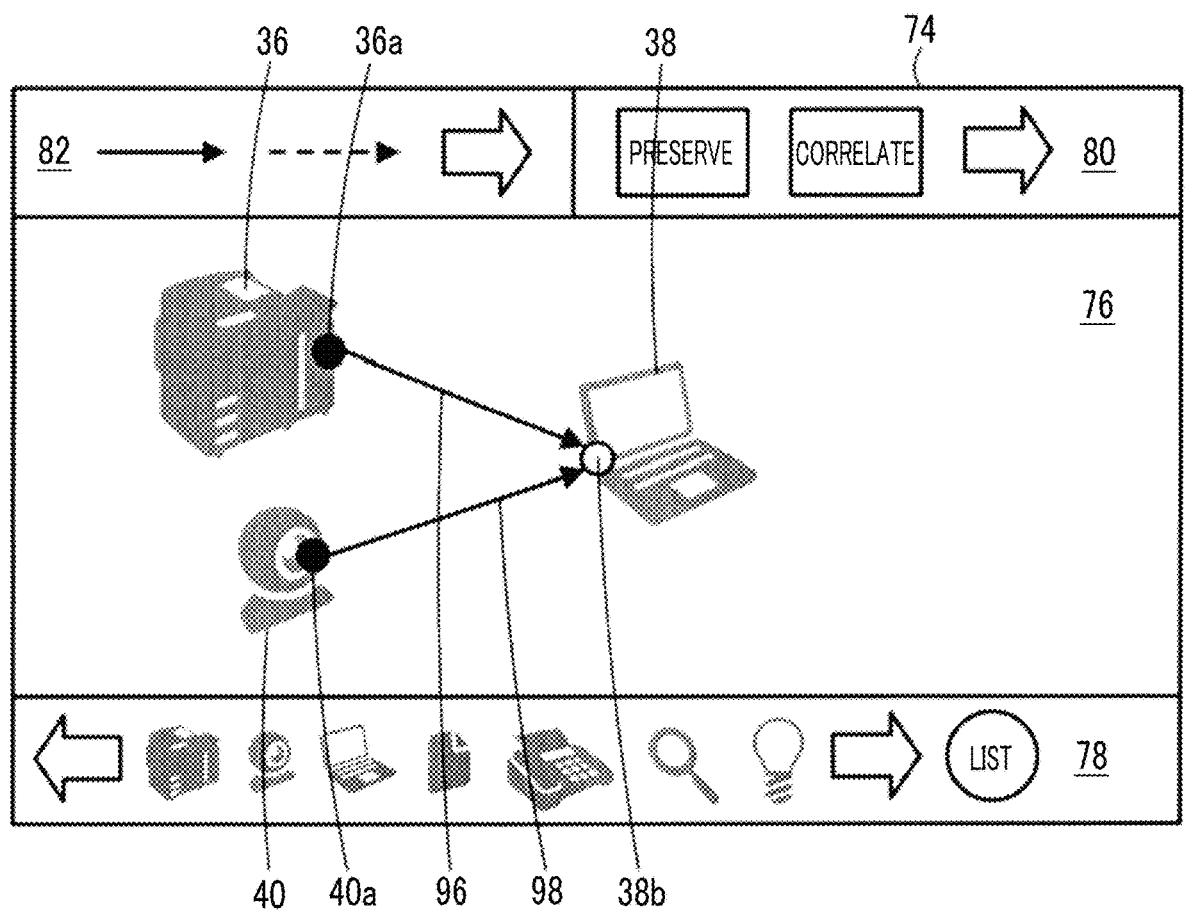
FIG. 17 is a diagram illustrating a screen.

Hereinafter, with reference to FIG. 17, Modification Example 7 will be described. FIG. 17 illustrates an example of a screen. As illustrated in FIG. 17, the apparatus image 36 associated with the multi-function peripheral B, the apparatus image 38 associated with the PC (D), and the apparatus image 40 associated with the sensor A are displayed in the display region 76. The connection portion image 36a for data output on the apparatus image 36 and the connection portion image 38b for data input on the apparatus image 38 are connected to each other via the arrow image 96. The connection portion image 40a for data output on the apparatus image 40 and the connection portion image 38b for data input on the apparatus image 38 are connected to each other via the arrow image 98. As mentioned above, a plurality of arrow images may be connected to a single connection portion image.

During execution of a cooperation function, in a case where data from the multi-function peripheral B is input to the PC (D), and data from the sensor A is input to the PC (D), the PC (D) may execute a function set therein. As another example, in a case where data from the multi-function peripheral B and data from the sensor A are input to the PC (D) simultaneously or within a predetermined time range, the PC (D) may execute a function set therein. The setting unit 28 registers a set content of the cooperation function in the set content management information.

In the example illustrated in FIG. 17, a plurality of arrow images are connected to a single connection portion image for data input, but a plurality of arrow images may be connected to a single connection portion image for data output such that a single connection portion image for data output is connected to a plurality of connection portion images for data input. In this case, pieces of data which are the same as or different from each other are output from the apparatus 12, software, or a function which is a data output source to the apparatus 12, software, or a function which is a data output destination.

The setting unit 28 may change a cooperation function to be set according to a display relationship among a plurality of connection portion images displayed on an identical configuration image. For example, the setting unit 28 changes a cooperation function to be set by changing an execution timing of a process performed by a configuration associated with the configuration image or a content of the process according to a display relationship among the plurality of connection portion images. The setting unit 28 may make cooperation functions to be set different from each other in a case where a plurality of connection portion images are separately displayed and a case where the plurality of connection portion images are integrally displayed.

Figure 18A:
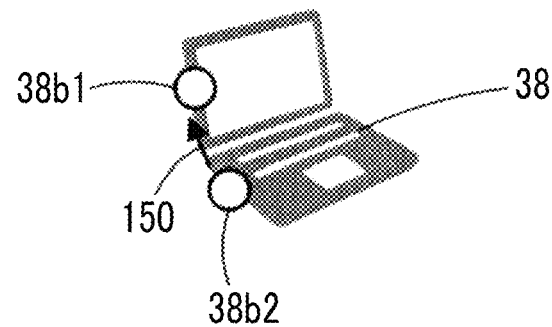
FIGS. 18A, 18B and 18C are diagrams illustrating apparatus images.
Figure 18B:
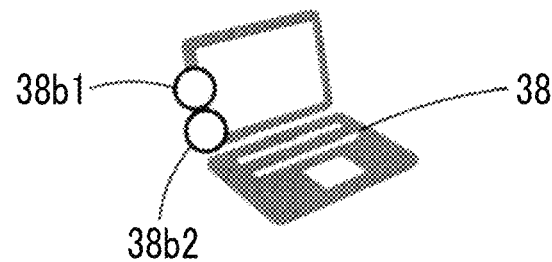
Figure 18C:
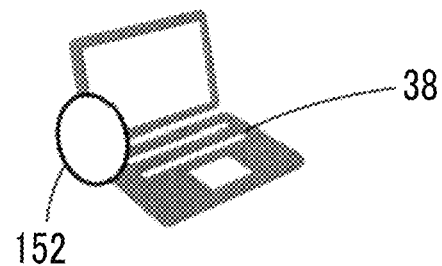

Hereinafter, with reference to FIGS. 18A, 18B, and 18C, such a process will be described. Each of FIGS. 18A, 18B, and 18C illustrates the apparatus image 38 associated with the PC (D). As illustrated in FIG. 18A, the connection portion images 38b1 and 38b2 for data input are displayed to overlap the apparatus image 38. The connection portion images may be operated by the user. For example, in a case where the user performs an operation of moving the connection portion image 38b2 in a direction of an arrow 150 on the screen, the display control unit 26 moves the connection portion image 38b2 in the direction of the arrow 150 on the apparatus image 38. Of course, the connection portion image 38b1 may be operated to be moved. As illustrated in FIG. 18B, the connection portion images 38b1 and 38b2 may be brought into contact with each other due to the movement. As illustrated in FIG. 18C, the display control unit 26 may combine the connection portion images 38b1 and 38b2 brought into contact with each other so as to generate a single connection portion image 152, and may display the connection portion image 152 to overlap the apparatus image 38. A size of the connection portion image 152 may be larger or smaller than a size of each of the connection portion images 38b1 and 38b2 before being combined, and may be the same as the size of each of the connection portion images 38b1 and 38b2. A shape of the connection portion image 152 may or not be the same as a shape of each of the connection portion images 38b1 and 38b2. The connection portion image 152 may be divided into a plurality of connection portion images by the user operating the connection portion image 152.

The setting unit 28 may change a cooperation function to be set according to the display form of the connection portion image illustrated in each of FIGS. 18A, 18B, and 18C.

For example, as illustrated in FIG. 18A, it is assumed that the connection portion images 38b1 and 38b2 are separately displayed to be separated from each other, and are respectively connected to arrow images extending from connection portion images for data output. In this case, during execution of a cooperation function, the PC (D) separately processes first data which is input to the PC (D) from a first configuration connected to the connection portion image 38b1 and second data which is input to the PC (D) from a second configuration connected to the connection portion image 38b2. For example, in a case where the first data and the second data are input to the PC (D) at different timings, the PC (D) individually processes each piece of data at the input timing.

As illustrated in FIG. 18B, it is assumed that the connection portion images 38b1 and 38b2 are displayed to be brought into contact with each other, and are respectively connected to arrow images extending from connection portion images for data output. In this case, during execution of a cooperation function, in a case where the first data is input to the PC (D), and the second data is input to the PC (D), the PC (D) executes a function set in the PC (D).

As illustrated in FIG. 18C, it is assumed that the combined connection portion image 152 is connected to arrow images extending from the first configuration and the second configuration. In this case, during execution of a cooperation function, in a case where the first data and the second data are input to the PC (D) simultaneously or within a predetermined time range, the PC (D) executes a function set therein.

As mentioned above, a cooperation function to be set is changed by changing a display form of one or a plurality of connection portion images.

A plurality of connection portion images for data output may be combined or divided.

Hereinafter, with reference to FIG. 19, a description will be made of a set content management table as an example of the set content management information. FIG. 19 illustrates an example of the set content management table. In the set content management table, as an example, an ID, configuration identification information for identifying a configuration used for a cooperation function, and information indicating a set content of the cooperation function are correlated with each other.

A cooperation function having the ID "1" is a cooperation function which is executable by using the multi-function peripheral B and a presentation application P. A cooperation function having the ID "2" is a cooperation function which is executable by using the multi-function peripheral B and a destination management application Q. A cooperation function having the ID "3" is a cooperation function which is executable by using the multi-function peripheral B, the main body portion B1, and the PC (D). A cooperation function having the ID "4" is a cooperation function which is executable by using a document creation application G and a business form creation application N. A cooperation function having the ID "5" is a cooperation function which is executable by using the multi-function peripheral B and the business form creation application N. A cooperation function having the ID "6" is a cooperation function which is executable by using a door opening/closing sensor E and a lighting apparatus F.

Each cooperation function illustrated in FIG. 19 is only an example, and other cooperation functions may be set.

During execution of a cooperation function, for example, the terminal equipment 10 or the repeater refers to the set content management table so as to specify a plurality of configurations used for a cooperation function, and sends control information indicating an execution instruction for the cooperation function to the plurality of configurations. Each configuration receiving the control information performs a process allocated thereto according to the control information. In the above-described way, the cooperation function is executed. Of course, after setting of a cooperation function is completed, the setting unit 28 may set in advance a set content of the cooperation function in each configuration. In this case, each configuration performs a process according to an execution timing of a process allocated thereto.

Each of the terminal equipment 10 and the apparatus 12 is realized through cooperation of hardware and software as an example. Specifically, each of the terminal equipment 10 and the apparatus 12 includes one or a plurality of processors such as CPUs (not illustrated). The one or plurality of processors read a program stored in a storage device (not illustrated) and execute the program, and thus a function of each unit of each of the terminal equipment 10 and the apparatus 12 is realized. The program is stored in a storage device via a recording medium such as a CD or a DVD, or a communication path such as a network. As another example, each unit of each of the terminal equipment 10 and the apparatus 12 may be realized by a hardware resource such as a processor, an electronic circuit, or an application specific integrated circuit (ASIC). A device such as a memory may be used for the realization. As still another example, each unit of each of the terminal equipment 10 and the apparatus 12 may be realized by a digital signal processor (DSP) or a field programmable gate array (FPGA).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a control section that makes display of an image of a configuration different between a case where the image of the configuration used for a cooperation function is displayed in a region for setting a cooperation function and a case where the image is not displayed in the region,
wherein the control section sets the cooperation function using the configuration and another configuration in response to determining that the image of the configuration is connected to an image of the other configuration through an image of a connection member in the region, wherein the image of the configuration, the image of the other configuration and the image of the connection member are displayed in the region, and the image of the connection member comprise a first portion that overlaps the image of the configuration and a second portion that overlaps the image of the other configuration,
wherein the control section displays an image of a portion where the image of the connection member is connected to the image of the configuration on the image of the configuration in a case where the image of the configuration is displayed in the region, and does not display the image of the portion in a case where the image of the configuration is not displayed in the region,
wherein, in a case where the image of the configuration and the image of the connection member are displayed in the region, the control section changes display and non-display of an image of the connection portion according to a positional relationship between the image of the configuration and the image of the connection member.

2. The information processing apparatus according to claim 1,
wherein the control section changes the cooperation function in a case where the display of the image of the configuration is changed.

3. The information processing apparatus according to claim 1,
wherein the control section displays the image of the connection portion in a case where a distance between the image of the configuration and the image of the connection member is equal to or less than a threshold value, and does not display the image of the connection portion in a case where the distance exceeds the threshold value.

4. The information processing apparatus according to claim 1,
wherein a function is allocated to each portion of the configuration, and
wherein the control section changes display and non-display of the image of the connection portion according to a positional relationship between an image of the portion of the configuration and the image of the connection member for each portion of the configuration.

5. The information processing apparatus according to claim 1,
wherein, in a case where the image of the connection member is already connected to the image of the configuration, the control section controls display of an image of another portion where another connection member is connected to the image of the configuration according to a positional relationship between the image of the configuration and an image of another connection member.

6. The information processing apparatus according to claim 1,
wherein the control section controls display of an image of a portion connected to the connection member in order for the configuration to receive input of data or controls display of an image of a portion connected to the connection member in order for the configuration to output data, according to a positional relationship between the image of the configuration and the image of the connection member.

7. The information processing apparatus according to claim 1,
wherein the control section changes the cooperation function according to a display relationship among images of a plurality of the connection portions.

8. The information processing apparatus according to claim 7,
wherein the control section makes cooperation functions different between a case where the images of the plurality of connection portions are separately displayed and a case where the images of the plurality of connection portions are integrally displayed.

9. The information processing apparatus according to claim 1,
wherein the control section changes the image of the configuration according to a function associated with the configuration displayed in the region.

10. The information processing apparatus according to claim 9,
wherein the control section controls display of the image of the configuration in a state of not being associated with the function in a case where the image of the configuration is not displayed in the region, and changes the image of the configuration according to the function associated with the configuration in a case where the image of the configuration is displayed in the region.

11. The information processing apparatus according to claim 9,
wherein the control section controls display of candidates of functions associated with the configuration in a case where the image of the configuration in a state of not being associated with the function is displayed in the region.

12. The information processing apparatus according to claim 9,
wherein the image of the configuration includes text indicating the function realized by the configuration.

13. The information processing apparatus according to claim 1,
wherein, in a case where images of a plurality of configurations used for a cooperation function are connected to each other, the image of the configuration is operated, and an operation amount of the image is equal to or more than a threshold value, the control section cancels cooperation of the plurality of configurations.

14. The information processing apparatus according to claim 13,
wherein, in a case where the image of the configuration is moved far away from an image of another configuration cooperating with the configuration, and a movement amount of the image is equal to or more than a threshold value, the control section cancels cooperation with the other configuration.

15. The information processing apparatus according to claim 1,
wherein the control section makes a display content of a state of the configuration different between a case where the cooperation function using the configuration is set and a case where the cooperation function is not set.

16. The information processing apparatus according to claim 15,
wherein, in a case where the cooperation function using the configuration is set, the control section controls display of a state of the configuration regarding the cooperation function.

17. The information processing apparatus according to claim 1,
wherein, in a case where setting of the cooperation function is completed, and then an image associated with information used for the cooperation function is moved to the region, the control section starts the cooperation function.

18. A non-transitory computer readable medium storing a program causing a computer to function as:
a control section that makes display of an image of a configuration different between a case where the image of the configuration used for a cooperation function is displayed in a region for setting a cooperation function and a case where the image is not displayed in the region,
wherein the control section sets the cooperation function using the configuration and another configuration in response to determining that the image of the configuration is connected to an image of the other configuration through an image of a connection member in the region, wherein the image of the configuration, the image of the other configuration and the image of the connection member are displayed in the region, and the image of the connection member comprise a first portion that overlaps the image of the configuration and a second portion that overlaps the image of the other configuration,
wherein the control section displays an image of a portion where the image of the connection member is connected to the image of the configuration on the image of the configuration in a case where the image of the configuration is displayed in the region, and does not display the image of the portion in a case where the image of the configuration is not displayed in the region,
wherein, in a case where the image of the configuration and the image of the connection member are displayed in the region, the control section changes display and non-display of an image of the connection portion according to a positional relationship between the image of the configuration and the image of the connection member.

\* \* \* \* \*